(12) United States Patent
Fukuda et al.

(10) Patent No.: US 6,962,366 B2
(45) Date of Patent: Nov. 8, 2005

(54) AIR BAG DEVICE

(75) Inventors: Kanichi Fukuda, Saitama (JP); Eisuke Kurata, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/454,794

(22) Filed: Jun. 4, 2003

(65) Prior Publication Data

US 2004/0026913 A1 Feb. 12, 2004

(30) Foreign Application Priority Data

Jun. 11, 2002 (JP) .......................................... 2002-170213
Jun. 11, 2002 (JP) .......................................... 2002-170342
Mar. 5, 2003 (JP) .......................................... 2003-058778

(51) Int. Cl.[7] .............................................. B60R 21/16
(52) U.S. Cl. .................................. 280/743.1; 280/743.2
(58) Field of Search .............................. 280/742, 743.1, 280/743.2

(56) References Cited

U.S. PATENT DOCUMENTS 5,498,031 A * 3/1996 Kosugi ..................... 280/743.2
5,765,867 A * 6/1998 French ..................... 280/743.2
5,865,466 A * 2/1999 Yamamoto et al. ....... 280/743.1
5,899,495 A * 5/1999 Yamamoto et al. ....... 280/743.1
6,076,854 A * 6/2000 Schenck et al. .......... 280/743.2
6,502,858 B2 * 1/2003 Amamori .................. 280/743.2

\* cited by examiner

*Primary Examiner*—Eric Culbreth
(74) *Attorney, Agent, or Firm*—Carrier, Blackman & Associates, P.C.; Joseph P. Carrier; William D. Blackman

(57) ABSTRACT

An air bag is formed by sewing a first basic fabric opposed to an occupant and a second basic fabric on the opposite side, at a sewn portion along an outer peripheries of the fabrics. The air bag is folded in a longitudinally longer shape, and an oblong restricting member is wound around a central portion of the air bag to fix the air bag in a bundling manner, and then the air bag is vertically folded. In the process of expansion of the air bag, the air bag bundled by the restricting member is first expanded vertically and then expanded laterally after breakage of a breaking portion of the restricting member which cannot withstand a tension. Thus, by providing the restricting member, the shape and direction of the air bag can be controlled as desired in the process of deployment.

5 Claims, 23 Drawing Sheets

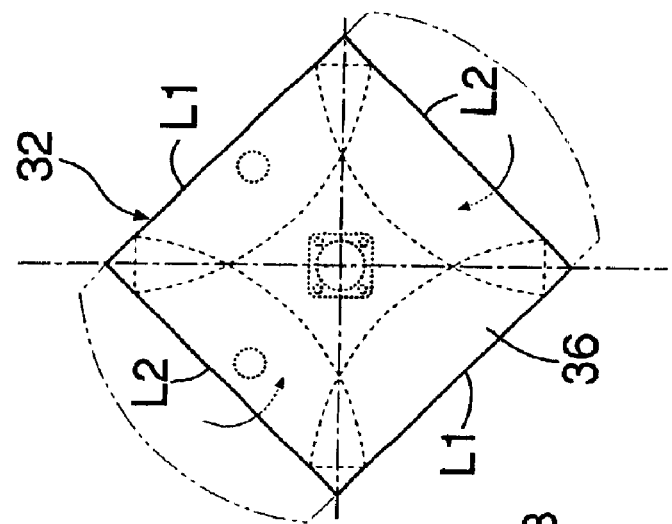
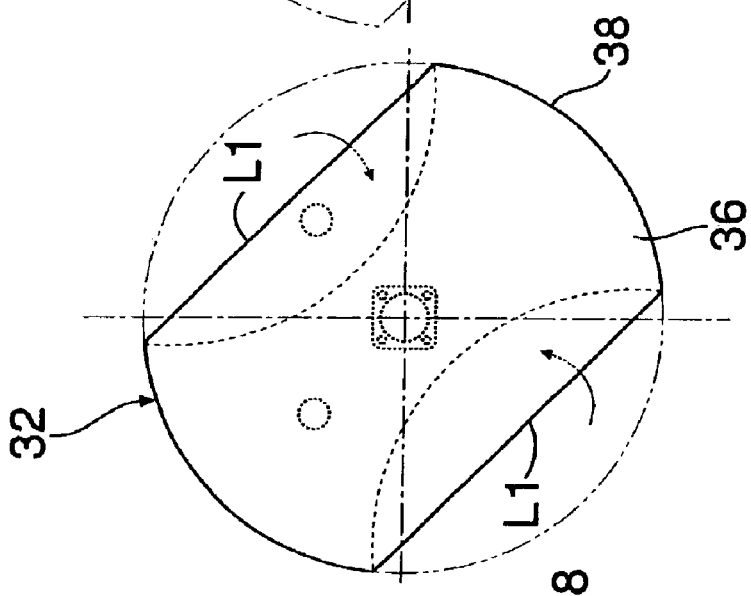
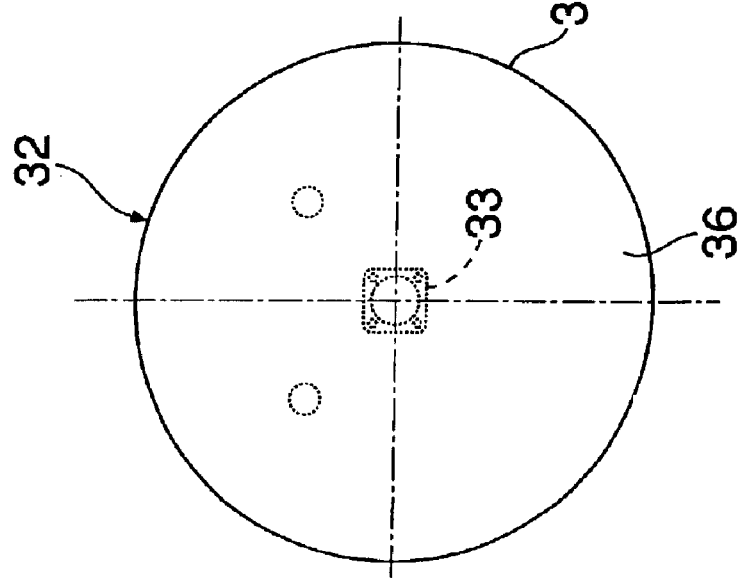

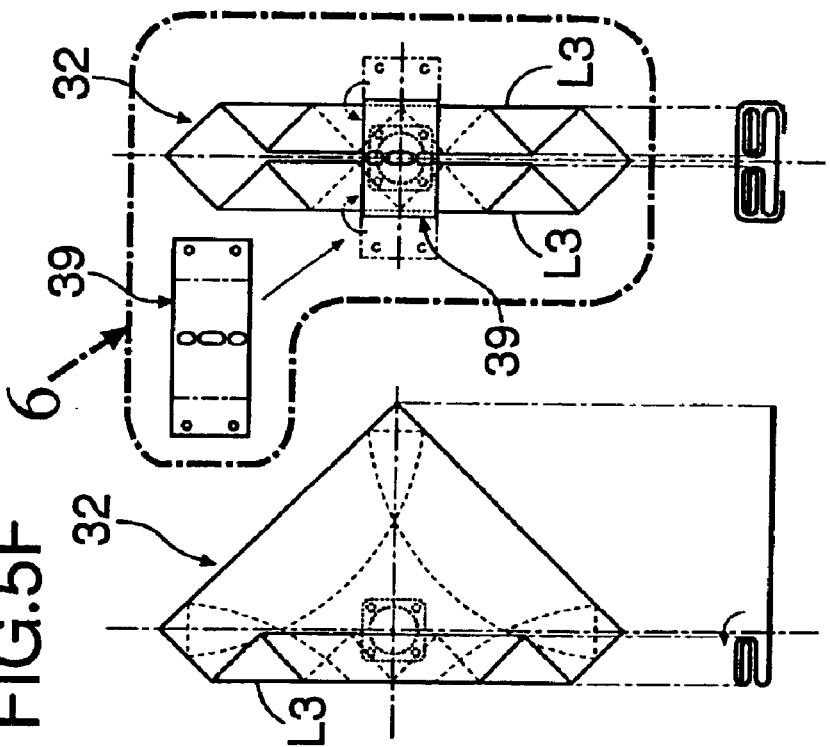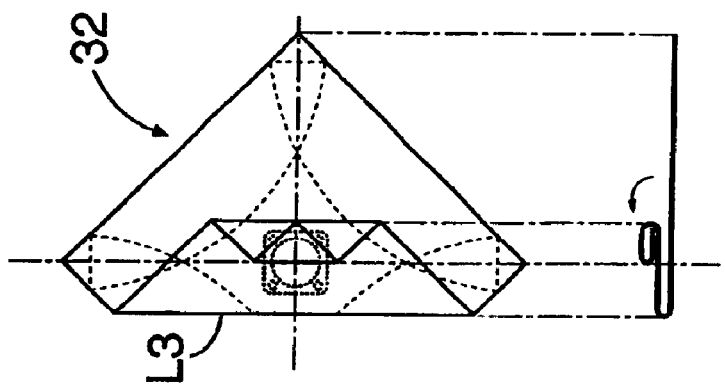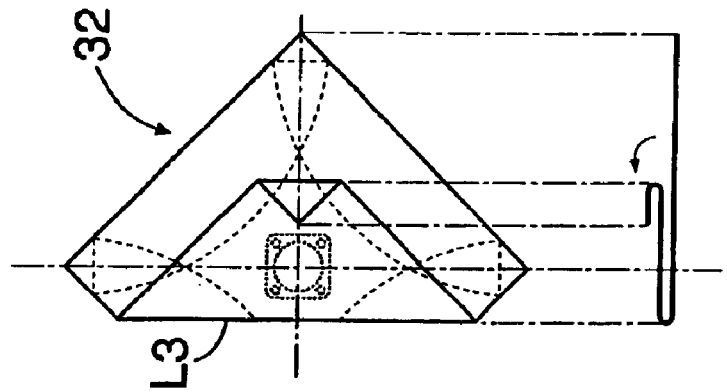

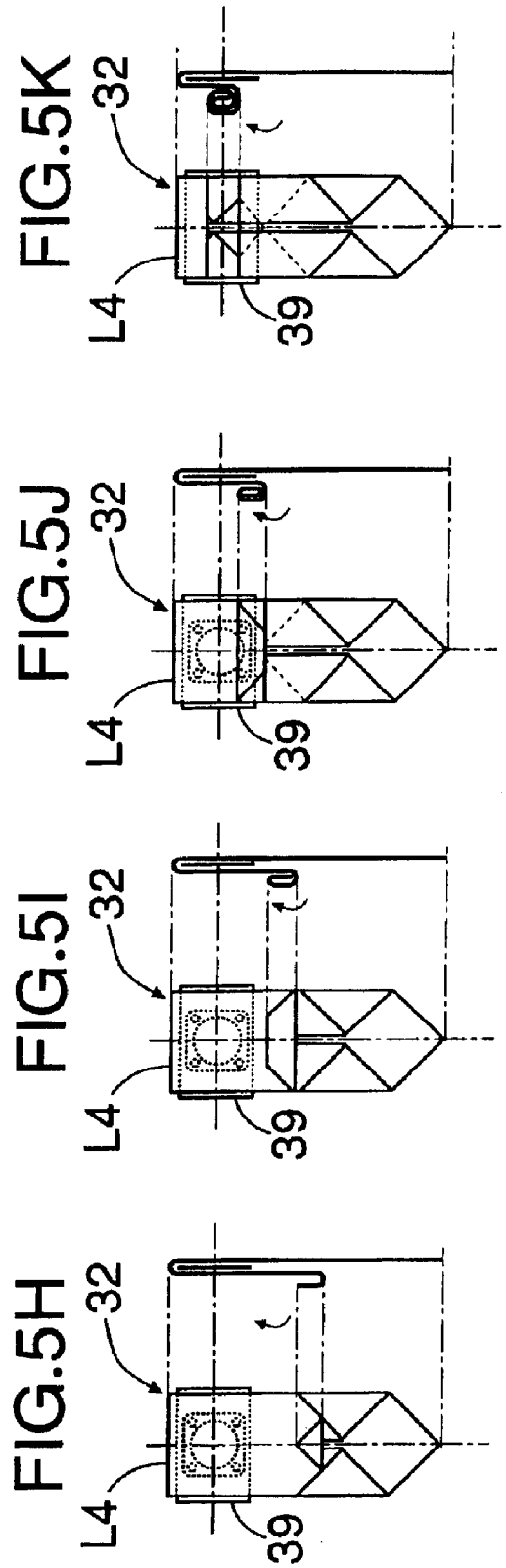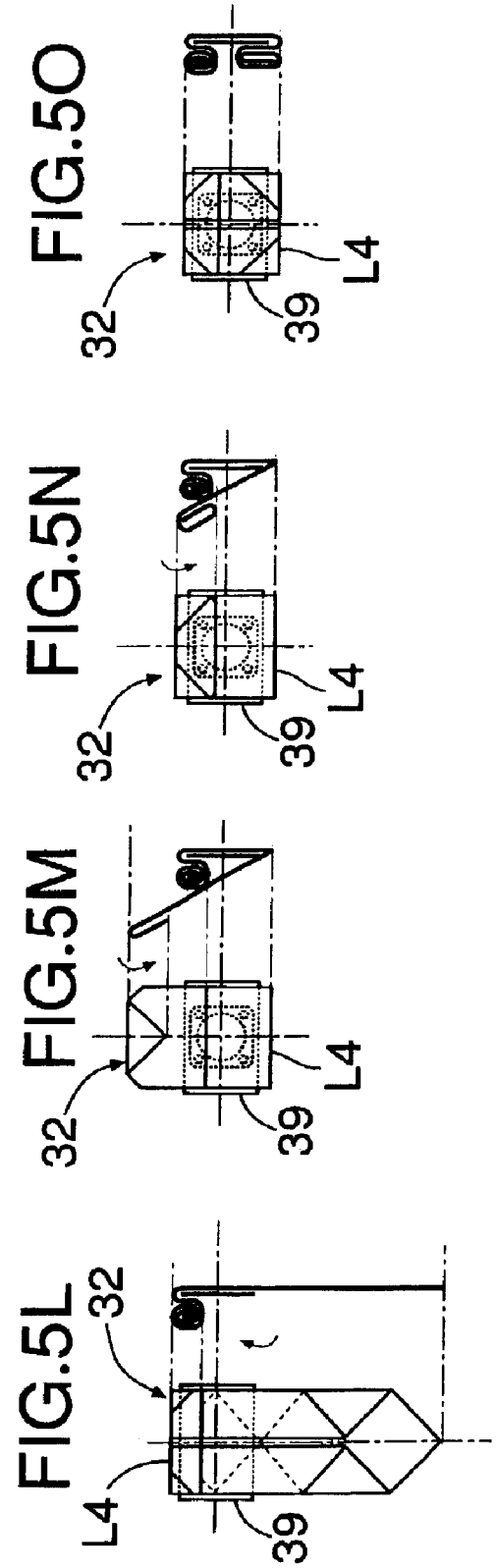

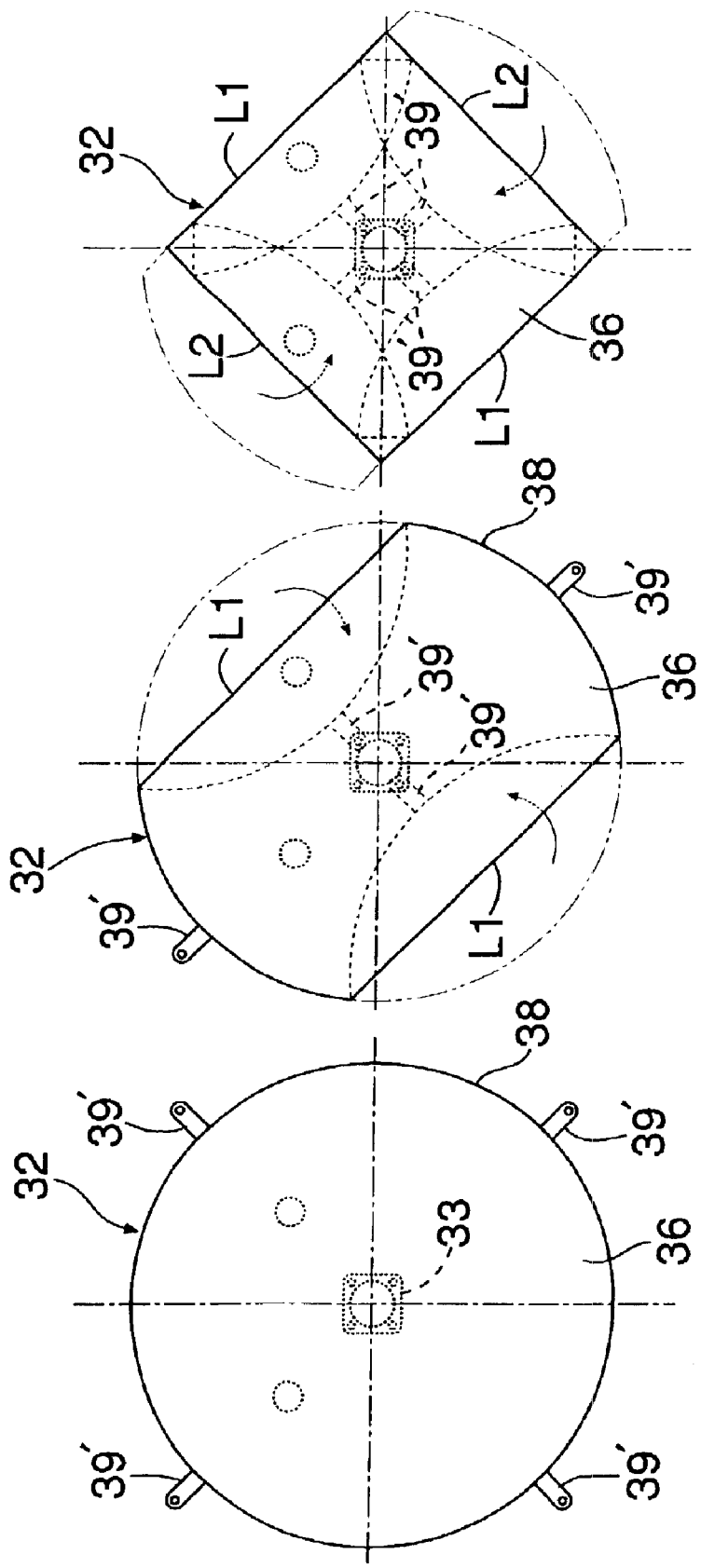

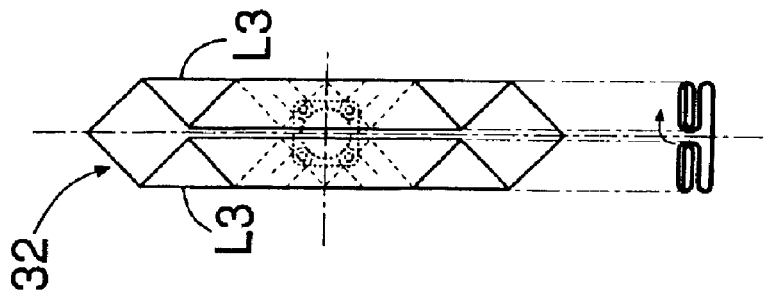
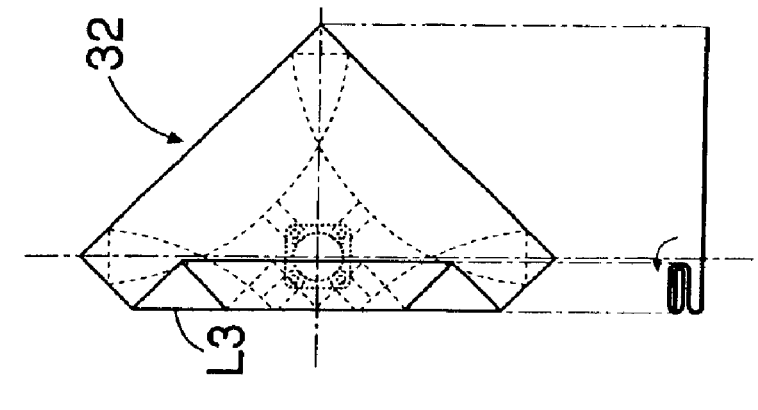
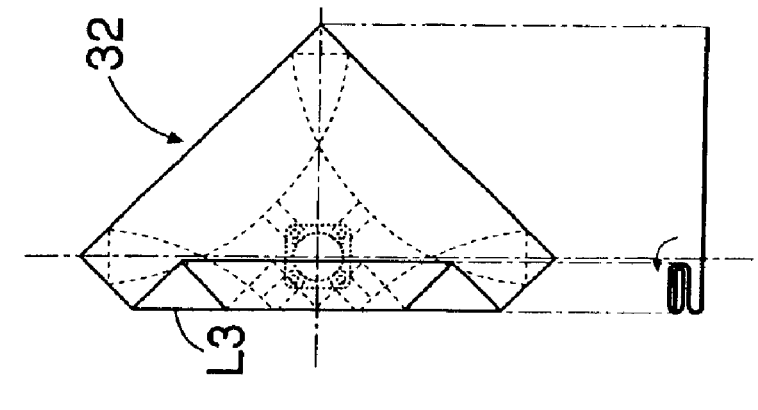
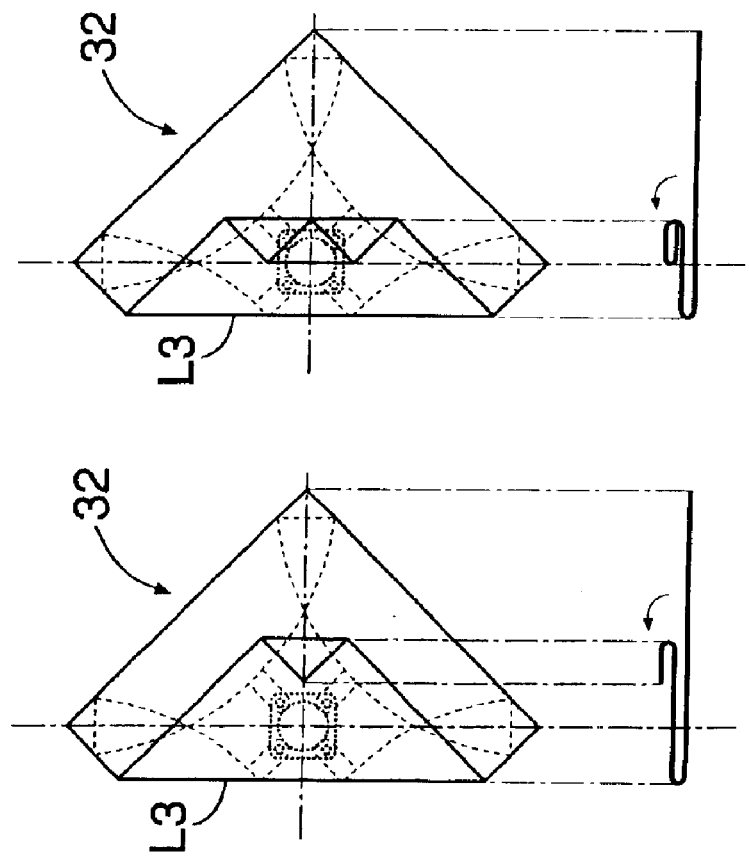

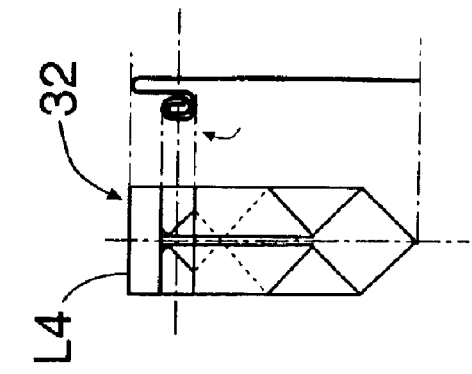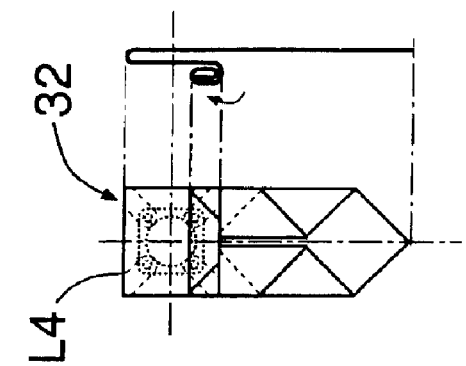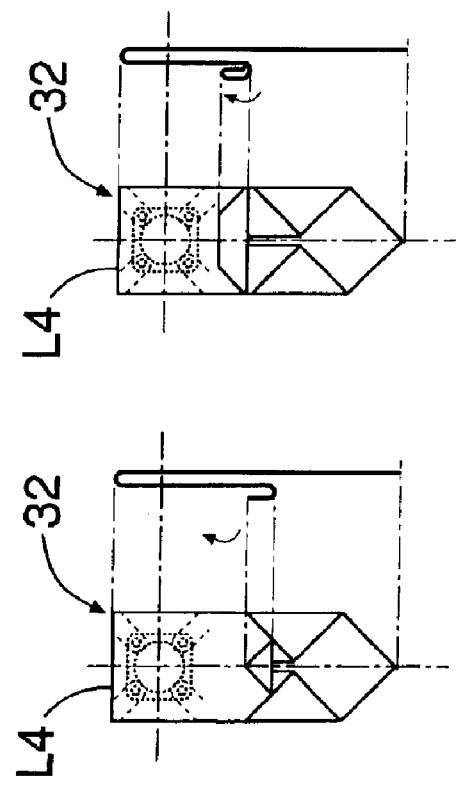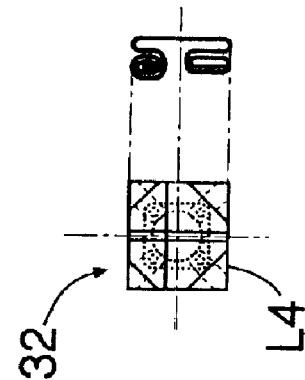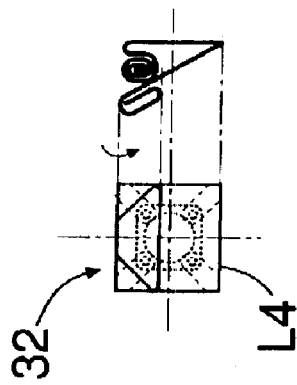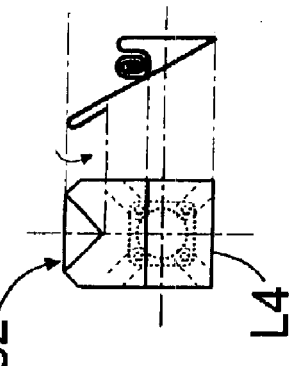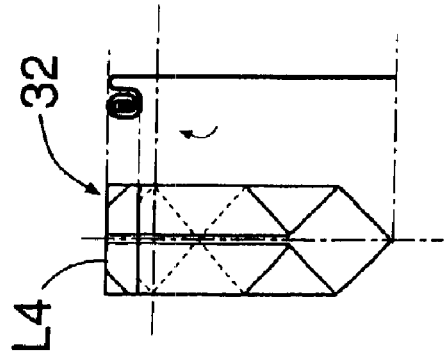

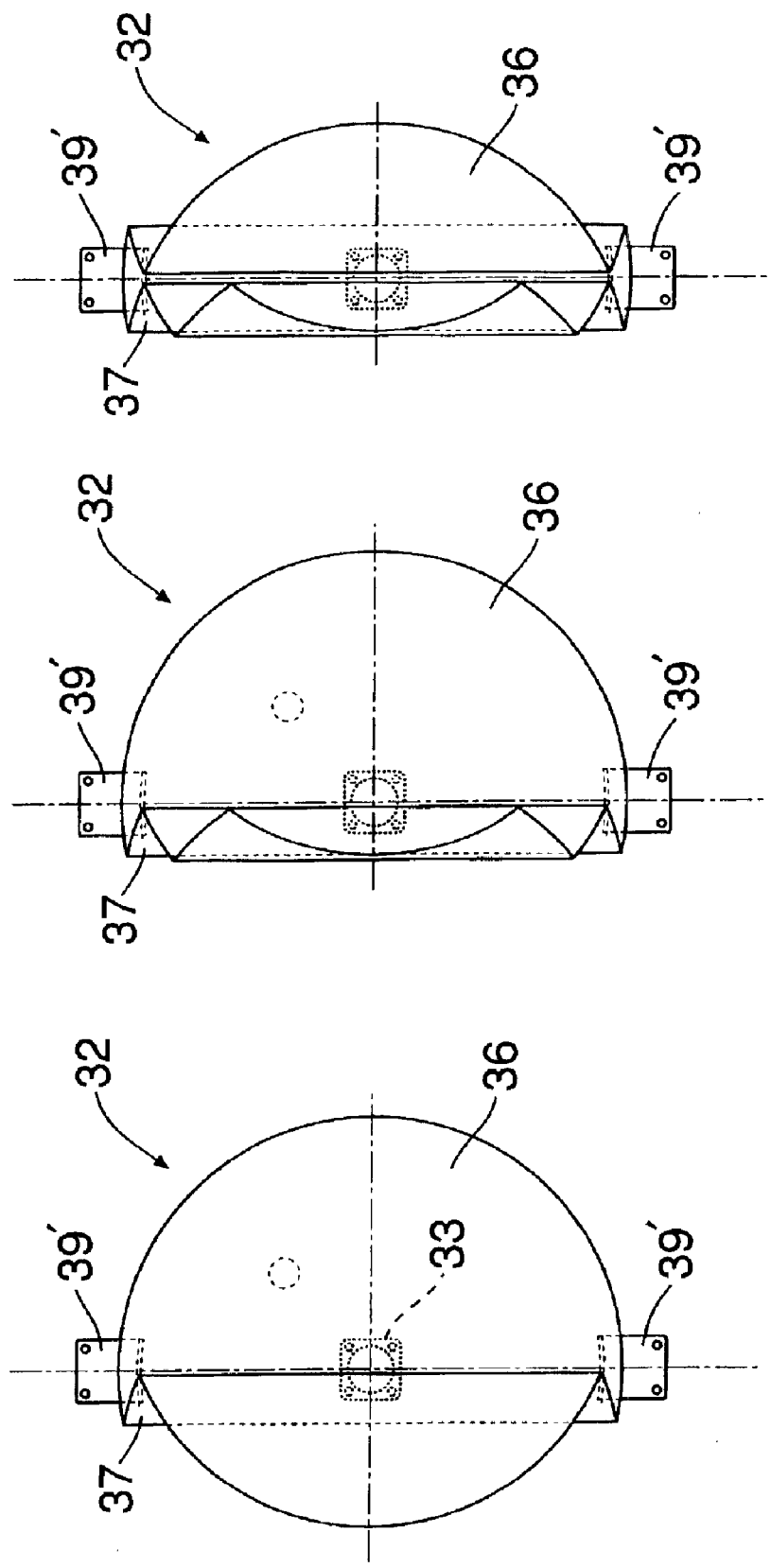

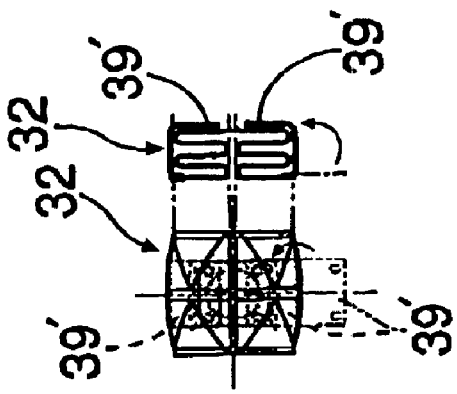
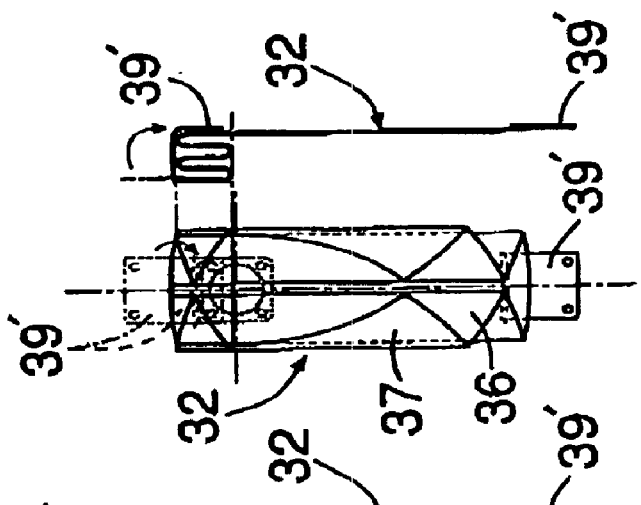
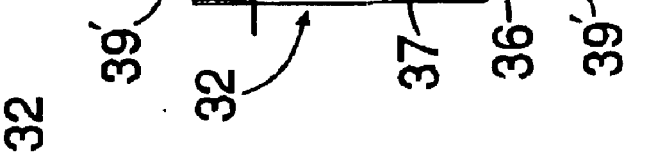
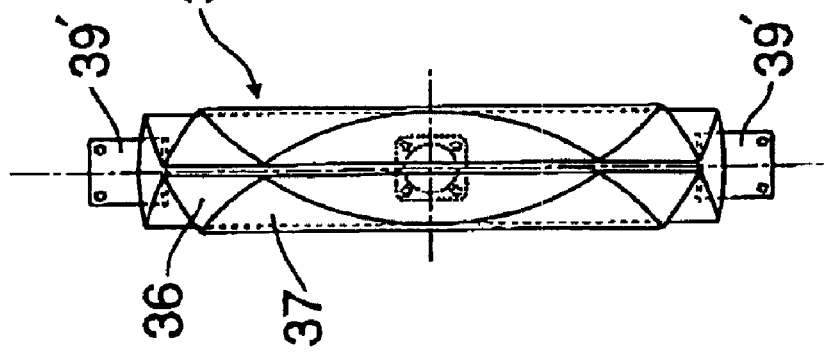

AIR BAG DEVICE

BACKGROUND OF THE INVENTION

1. Field of the Invention

The present invention relates to an air bag device adapted to make a folded air bag expanded and deployed into a vehicle compartment by a gas generated by an inflator upon collision of a vehicle.

2. Description of the Related Art

An air bag adapted to be deployed into a vehicle compartment from a central portion of a steering wheel upon collision of a vehicle in order to restrain an occupant is generally formed by sewing two circular basic fabrics along their outer peripheries. The air bag is adapted to be expanded into a flat spherical shape by a gas generated by an inflator fixed in an opening provided in the center of one of the basic fabrics.

An upper body half of an occupant to be restrained by the air bag extends vertically, and hence the occupant-restraining performance can be enhanced by deploying the air bag first vertically and then laterally. In such a way, the order of folding the air bag has been conventionally devised in order to control the shape and direction of deployment of the air bag, as described above.

However, it is difficult to sufficiently control the shape and direction of the air bag in the process of deployment only by devising the order of folding the air bag, and the development of a further reliable technique has been desired.

A sewn portion of each basic fabric of the air bag is harder than the other portions of the air bag, due to its increased thickness where the basic fabric is superposed and due to an influence of the rigidity of a sewing thread. Therefore, in order to softly restrain an occupant in the process of deployment of the air bag, it is desirable to avoid the contact between the sewn portion and the occupant. For this purpose, it is necessary to deploy first the central portion of the air bag and then the outer periphery of the air bag.

SUMMARY OF THE INVENTION

Accordingly, it is a first object of the present invention to ensure that the shape and direction of the air bag can be controlled as desired in the process of deployment.

It is a second object of the present invention to ensure that when the air bag having a sewn portion along its outer periphery is deployed, the sewn portion is prevented from contacting an occupant.

To achieve the above first object, according to a first feature of the present invention, there is provided an air bag device adapted to make a folded air bag expanded and deployed into a vehicle compartment by a gas generated by an inflator upon collision of a vehicle, wherein a folded shape of the air bag is restricted by a restricting member at an intermediate stage in the process of folding the air bag, and when the air bag is expanded, it breaks the restricting member to be expanded.

With the above arrangement, when the folded air bag is expanded and deployed into the vehicle compartment while being unfolded by the gas generated by the inflator, the air bag is expanded while the folded shape is being restricted by the restricting member. Eventually, the restricting member cannot withstand a tension and thus breaks, permitting the entire air bag to be deployed. Therefore, the shape and direction of the air bag can be controlled as desired in the process of deployment.

To achieve the second object, according to a second feature of the present invention, there is provided an air bag device in which a folded air bag having a sewn portion along its outer periphery and an inflator are supported on a retainer. The air bag device is adapted to expand and deploy the air bag into a vehicle compartment by a gas generated by the inflator upon collision of a vehicle. Further, a base of the air bag fixed to the retainer and the outer periphery of the air bag are connected to each other by a connecting member in the process of folding the air bag, and when the air bag is expanded, the force of the expansion breaks the connecting member.

With the above arrangement, when the folded air bag is expanded and deployed into the vehicle compartment by the gas generated by the inflator, the air bag is expanded while its shape is being restricted by the connecting member, because the base portion and the outer periphery of the air bag are connected to each other by the connecting member. Eventually, the restricting member cannot withstand a tension, and breaks, permitting the entire air bag to be deployed. Therefore, the deployment of the outer periphery of the air bag connected to the connecting member is retarded, whereby the sewn portion provided in the outer periphery and harder than the other portions can be prevented from contacting an occupant.

The above and other objects, features and advantages of the invention will become apparent from the following description of the preferred embodiments taken in conjunction with the accompanying drawings.

BRIEF DESCRIPTION OF THE DRAWINGS

FIGS. 1 to 7 show a first embodiment of the present invention, wherein

FIG. 1 is a perspective view of a front portion of a vehicle compartment of an automobile;

FIG. 2 is an enlarged sectional view taken along a line 2—2 in FIG. 1;

FIG. 3 is an exploded perspective view of an air bag module;

FIG. 4 is an exploded perspective view of an air bag;

FIGS. 5A to 5O are diagrams showing an order of folding the air bag;

FIG. 6 is a detailed diagram of a portion indicated by 6 in FIG. 5G; and

FIG. 7 is a diagram for explaining the operation during deployment of the air bag.

FIGS. 9 to 14 show a third embodiment of the present invention, wherein

FIG. 9 is a view similar to FIG. 2;

FIG. 10 is an exploded perspective view of an air bag module;

FIG. 11 is n exploded perspective view of an air bag;

FIG. 12 is a view showing a first step of folding the air bag;

FIGS. 13A to 13O are diagrams showing an order of folding the air bag; and

FIG. 14 is a diagram of the operation during deployment of the air bag.

FIGS. 15 and 16 show a fourth embodiment of the present invention, wherein

FIG. 15 is a view similar to FIG. 12; and

FIG. 16 is a sectional view taken along a line 16—16 in FIG. 15.

FIGS. 17 to 18G show a fifth embodiment of the present invention, wherein

FIG. 17 is a view showing an air bag before being folded; and

FIGS. 18A to 18G are diagrams showing an order of folding the air bag.

DESCRIPTION OF THE PREFERRED EMBODIMENTS

A first embodiment of the present invention will now be described by way of preferred embodiments with reference to FIGS. 1 to 7.

Figure 1:
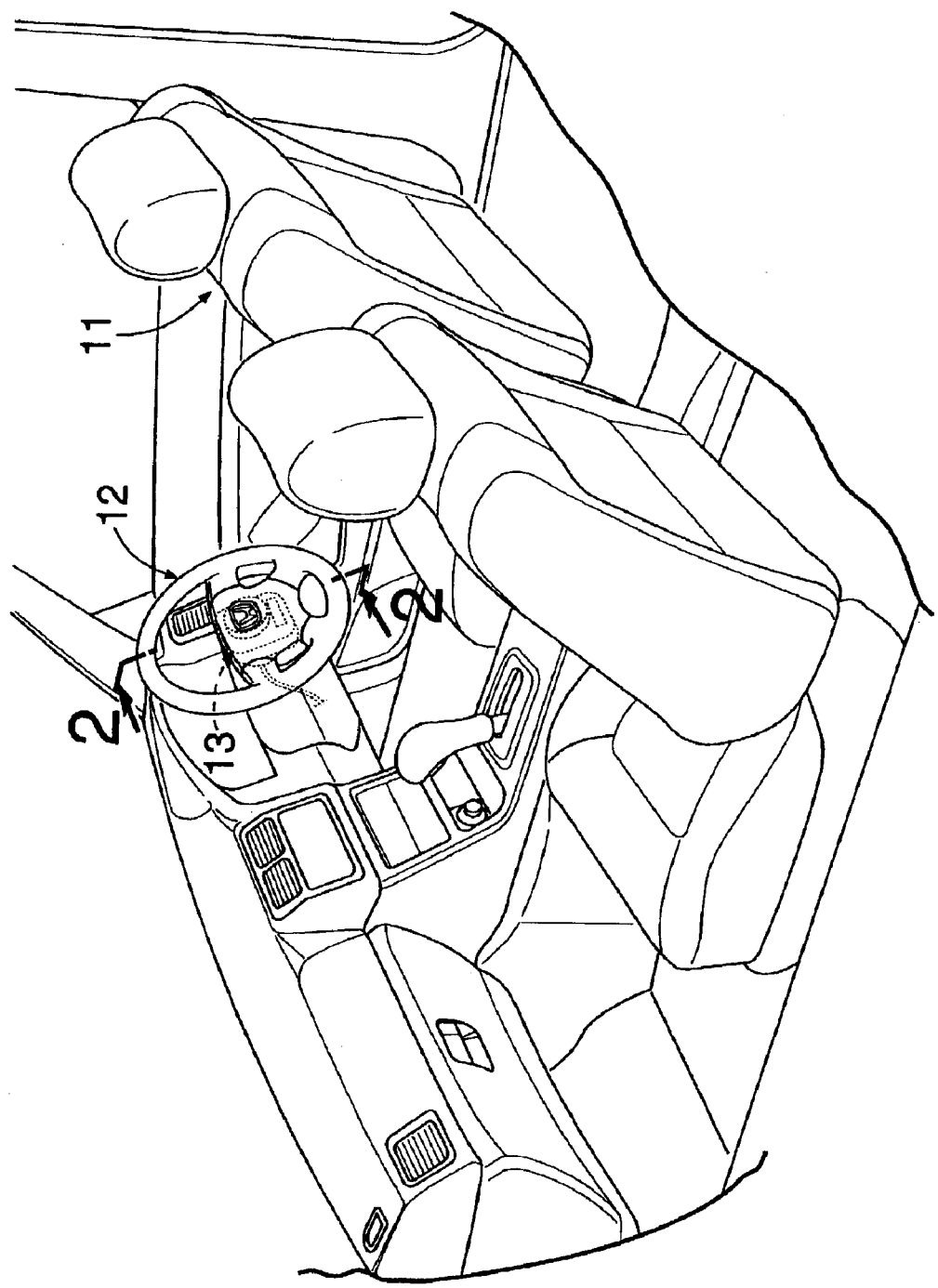

As shown in FIG. 1, an air bag module 13 for a driver's seat is accommodated within a steering wheel 12 disposed in front of the driver's seat 11.

Figure 2:
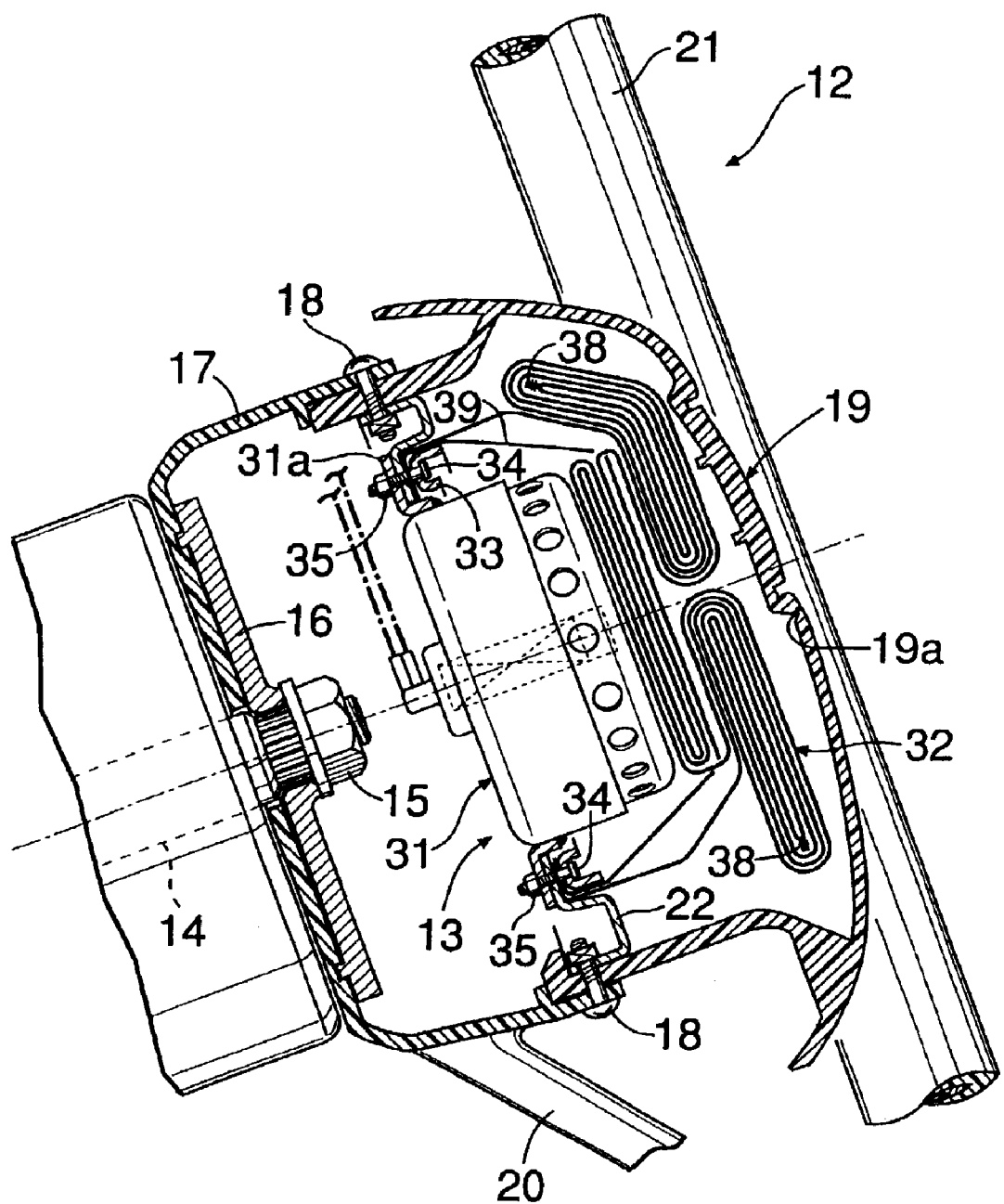
Figure 3:
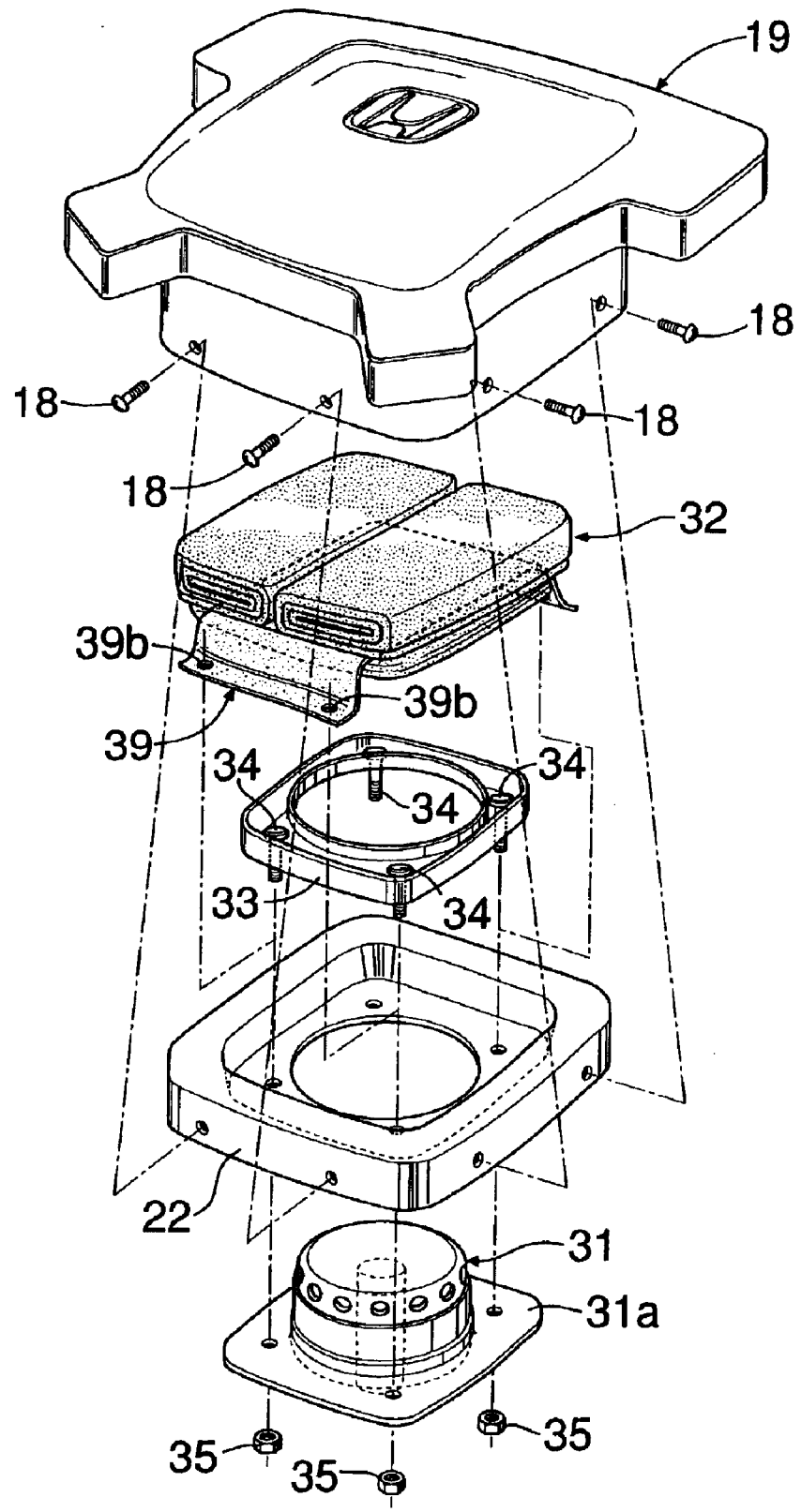

As shown in FIGS. 2 and 3, the steering wheel 12 includes a boss 16 fixed to a rear end of a steering shaft 14 by a nut 15, a front cover 17 fixed to the boss 16, a rear cover 19 fixed to a rear surface of the front cover 17 by bolts 18, a plurality of spokes 20 extending radially from the front cover 17, and a steering wheel body 21 connected to outer peripheries of the spokes 20. A retainer 22 is fastened to an inner peripheral surface of the rear cover 19 commonly by bolts 18, and supports the air bag module 13. A thin tear line 19a (see FIG. 2) is formed on an inner surface of the rear cover 19 and adapted to be broken upon expansion of an air bag 32.

The air bag module 13 includes an inflator 31 filled with a detonator to be burned to generate a high-pressure gas, the air bag 32 formed by sewing base fabrics, and a fixing ring 33 for fixing a base portion of the air bag 32. A flange 31a formed around an outer periphery of the inflator 31 and the fixing ring 33 are superposed on a front surface and a rear surface of the retainer 22, and fixed by bolts 34 and nuts 35 mounted in the fixing ring 33. At this time, the air bag 32 is fixed with its base portion sandwiched between the rear surface of the retainer 22 and the fixing ring 33.

Figure 4:
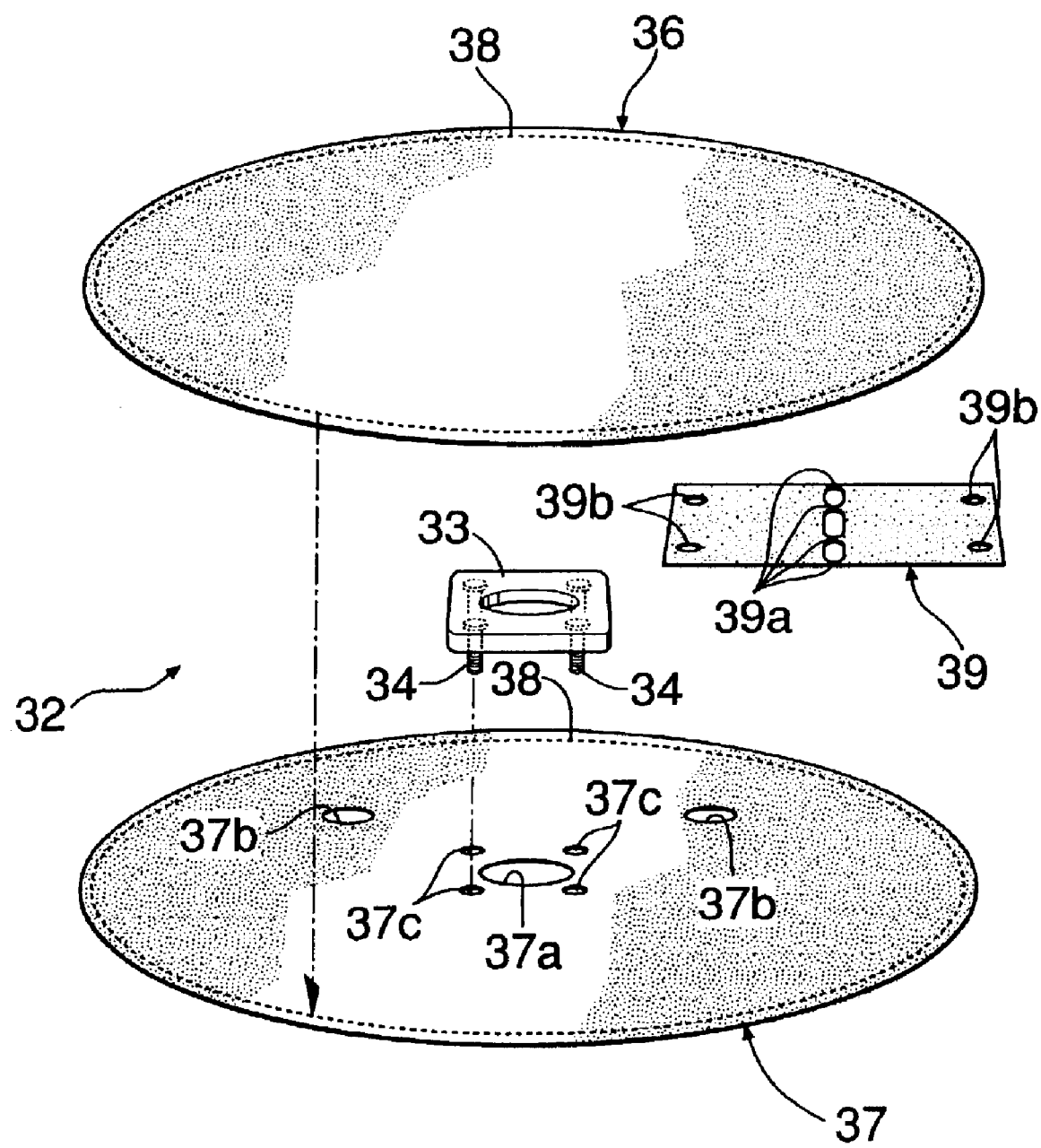
Figure 6:
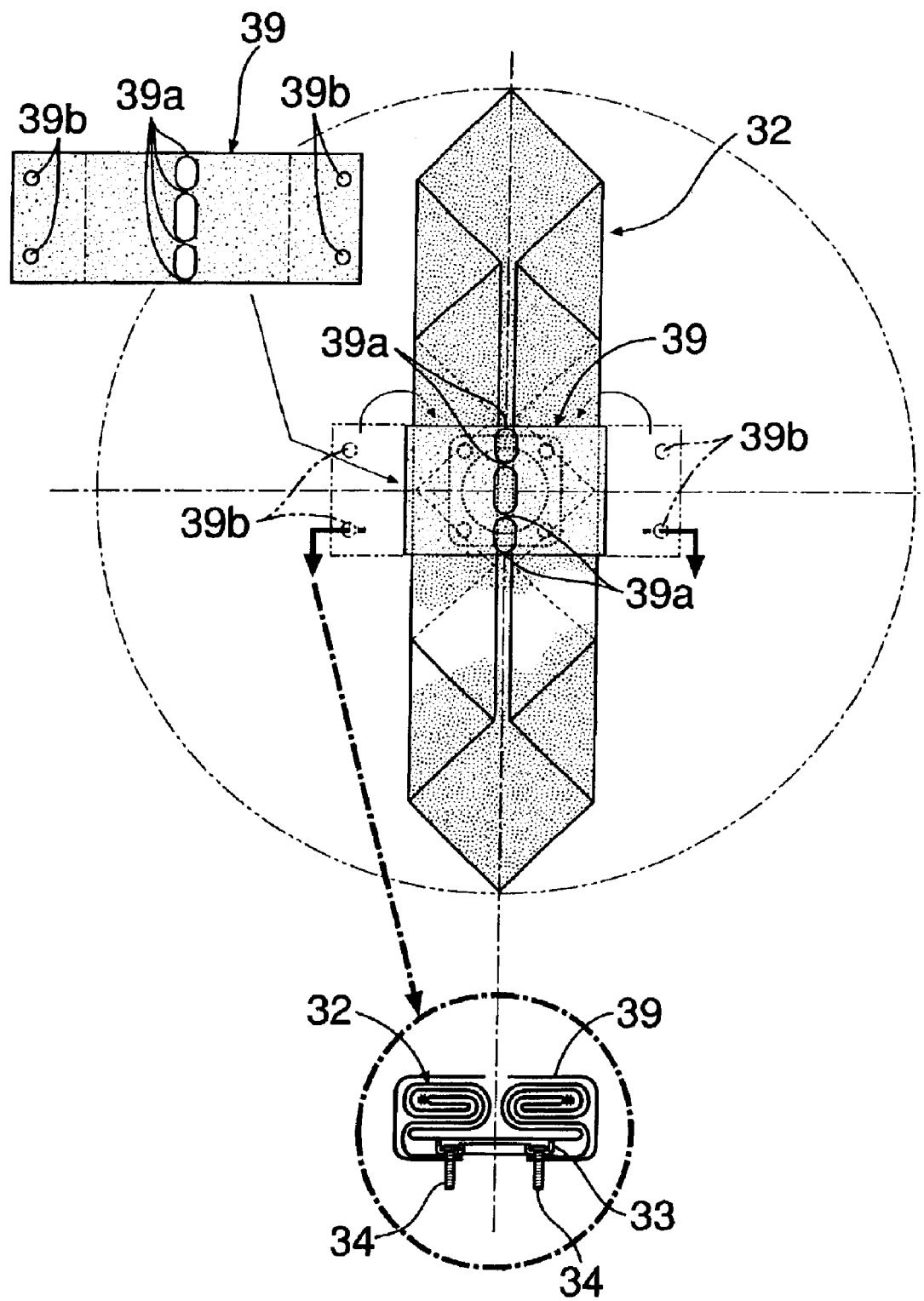

As shown in FIG. 4, the circular air bag 32 includes a first base fabric 36 on a back side (on a side opposed to an occupant), and a second base fabric 37 superposed on a front surface of the first base fabric 36. The first and second base fabrics 36 and 37 are sewn integrally to each other at a sewn portion 38 provided around the outer periphery. A central portion of the second base fabric 37 which becomes the base portion of the air bag 32 is provided with a circular opening 37a surrounding the inflator 31, vent holes 37b, 37b for releasing a portion of the gas upon the expansion of the air bag 32, and bolt bores 37c through which the bolts 34 are passed. An oblong restricting member 39 has breaking portions 39a provided at its central portion forming slits and capable of being easily broken, and four bolt bores 39b provided at its opposite ends.

The order of folding the air bag 32 will be described below with reference to FIGS. 5A to 5O.

First, the fixing ring 33 is inserted through the opening 37a in the second base fabric 37 into the flatly spread air bag 32, and the four bolts 34 provided in the fixing ring 33 are inserted through the four bolt bores 37c in the second base fabric 37, as shown in FIG. 5A. Then, the air bag 32 is folded forwards along two folding lines L1, L1 inclined at 45°, as shown in FIG. 5B, and the air bag 32 is further folded forwards along two folding lines L2, L2 perpendicular to the two folding lines L1, L1, as shown in FIG. 5C.

A left half of the air bag 32 formed into a square shape as the above-described manner is folded backwards along a folding line L3, as shown in FIG. 5D, and then folded so that it is wound leftwards from the side of its tip end, as shown in FIGS. 5D to 5F. Subsequently, a right half of the air bag 32 is folded laterally symmetrically with the left half, as shown in FIG. 5G. When the air bag 32 is brought into a longitudinally longer shape in the above-described manner, the oblong restricting member 39 is wound around the central portion of the air bag 32, and the four bolts 34 in the fixing ring 33 are passed through the four bolts bores 39b in the opposite ends. In this state, the breaking portions 39a of the restricting member 39 are located on a vertical center line of the air bag 32.

Then, an upper half of the air bag 32 is folded rearwards along a folding line L4, as shown in FIG. 5H, and then folded so that it is wound upwards from the side of its tip end, as shown in FIGS. 5H to 5L. Subsequently, a lower half of the air bag 32 is folded substantially vertically symmetrically with the upper half into a square block shape, as shown in FIGS. 5M to 5O, whereby the folding-up of the air bag 32 is completed. The folding frequency of the upper half (see FIGS. 5H to 5L) is larger than that of the lower half (see FIGS. 5M to 5O) in the embodiment.

In a state in which the inflator 31 has been inserted through the opening 37a in the second base fabric 37 into the completely folded air bag 32, the four bolts 34 mounted in the fixing ring 33 and passed through the four bolts bores 37c in the second base fabric 37 and the four bolt bores 39b in the restricting member 39 are further passed through the retainer 22 and the flange 31a of the inflator 31 and fastened by the nuts 35, whereby the air bag 32 is fixed in a manner that the periphery of the opening 37a in the second base fabric 37 and the opposite ends of the restrained member 39 are sandwiched between the fixing ring 33 and the retainer 22.

Thus, when an acceleration equal to or higher than a predetermined value is detected upon collision of a vehicle, the inflator 31 is ignited, whereby the folded air bag 32 is started to be expanded by the gas generated by the inflator 31. The tear line 19a of the rear cover 19 receiving a pressure of expansion of the air bag 32 is broken, and the air bag 32 is deployed into a vehicle compartment through an opening resulting from the breakage of the tear line 19a.

Figure 7:
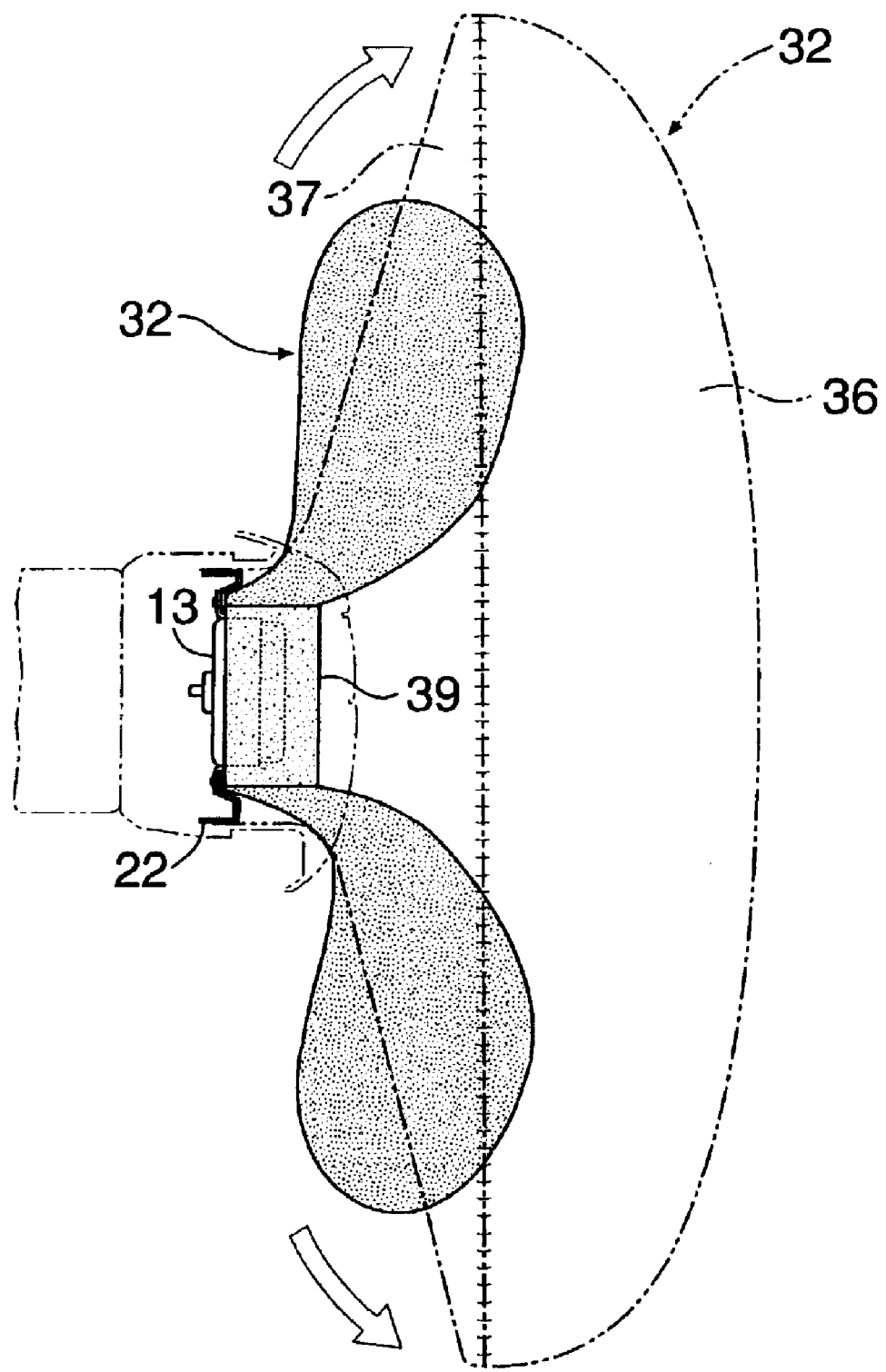

As shown in FIG. 7, the air bag folded in the longitudinally longer shape (see FIG. 6) has been bundled by the restricting member 39 at the time when the air bag 32 is unfolded in the process of expansion of the air bag 32, and hence the air bag 32 cannot be expanded laterally and is first expanded vertically. Thereafter, when the breaking portions 39a of the restricting member 39 cannot withstand the pressure of the gas and are broken, the air bag 32 is laterally expanded to be deployed into a final shape shown by a dashed line in FIG. 7. In this way, the air bag 32 can be first expanded vertically and then expanded laterally by controlling the process of expansion of the air bag 32 by the operation of the restricting member 39, whereby reliably restraining an occupant's body extending vertically.

Figure 8:
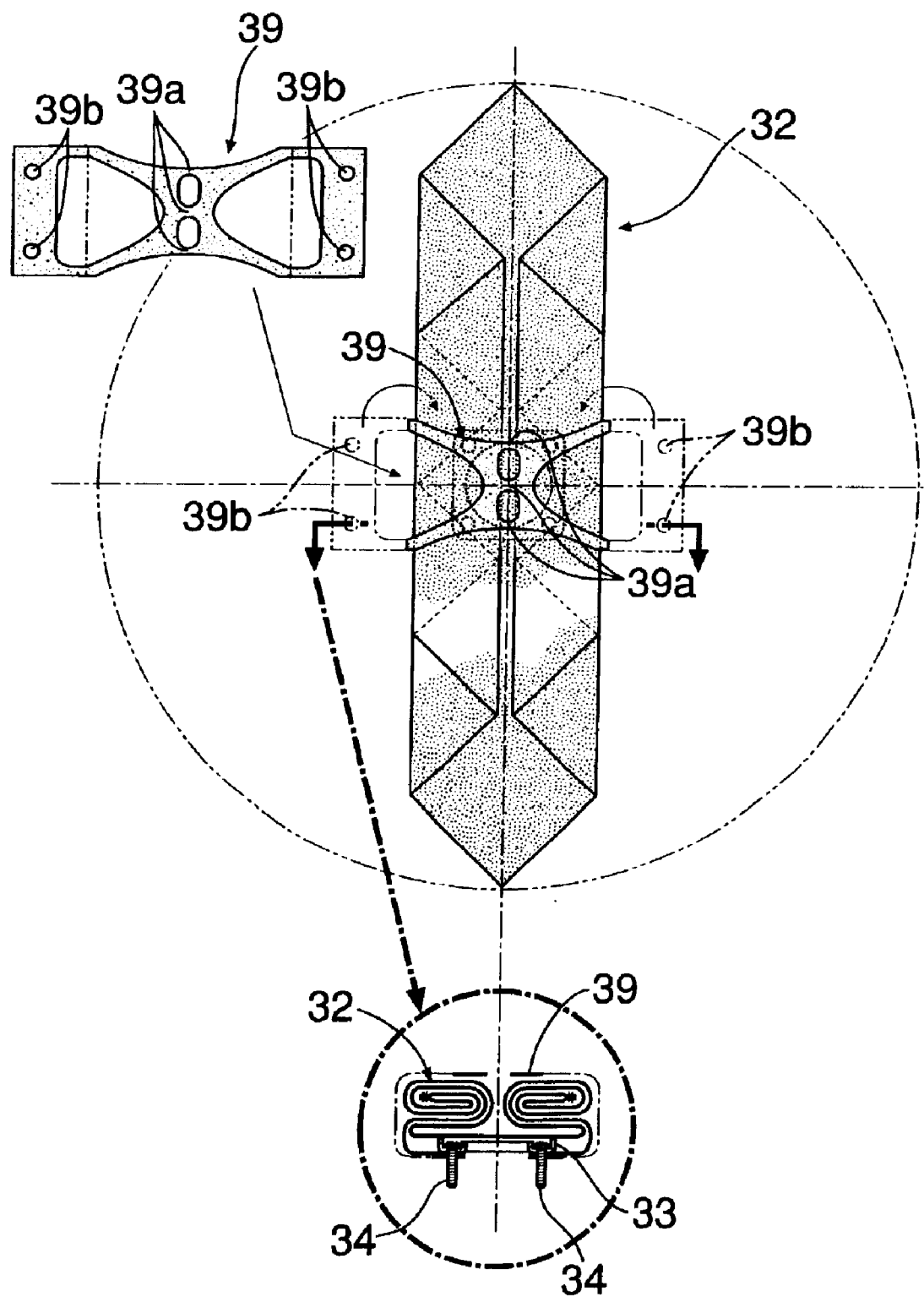
FIG. 8 is a diagram similar to FIG. 6, but according to a second embodiment of the present invention.

The shape of the restricting member 39 is not limited to that in the first embodiment, and can be changed properly as in a second embodiment shown in FIG. 8.

A third embodiment of the present invention will now be described with reference to FIGS. 9 to 14.

Figure 9:
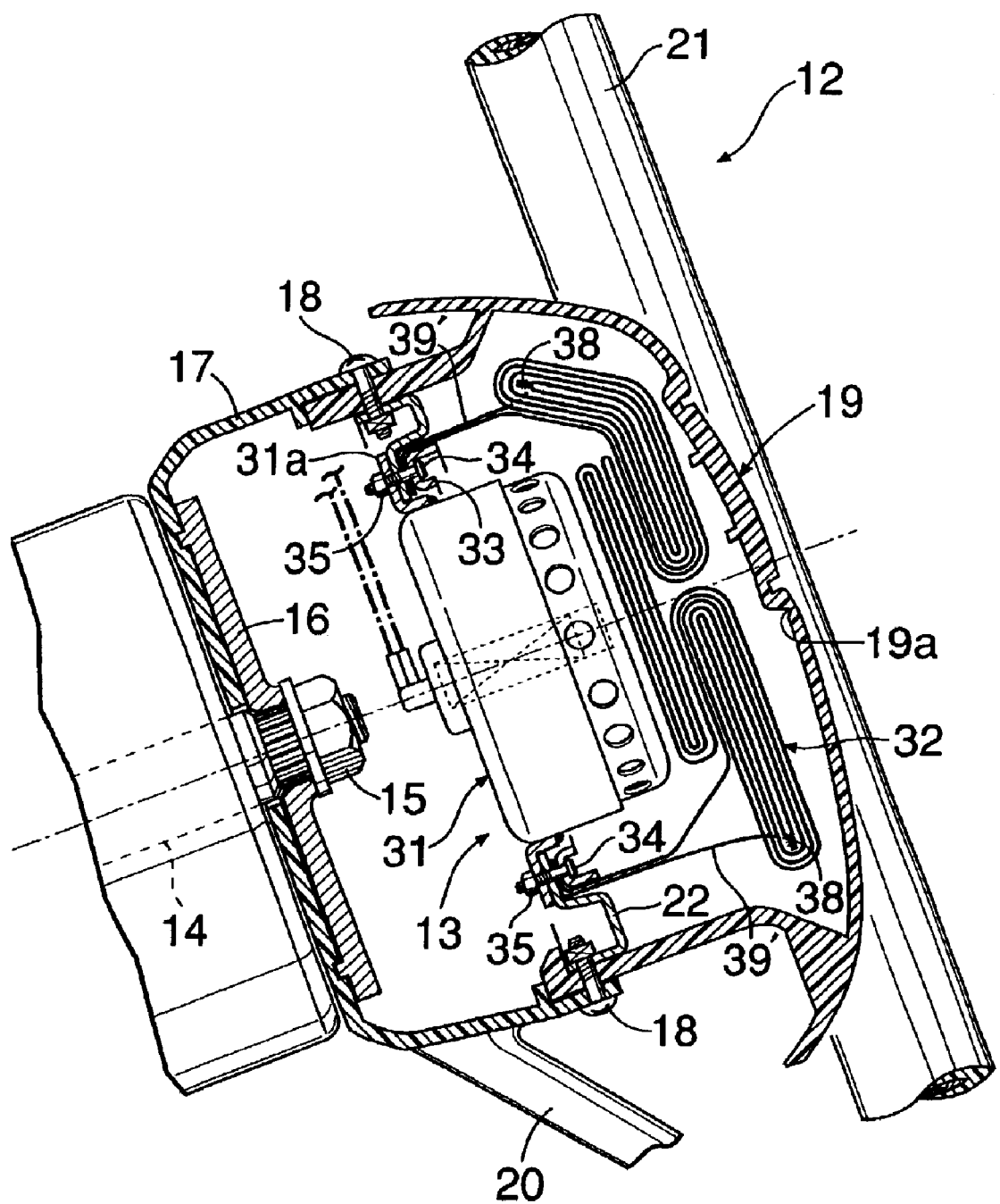
Figure 10:
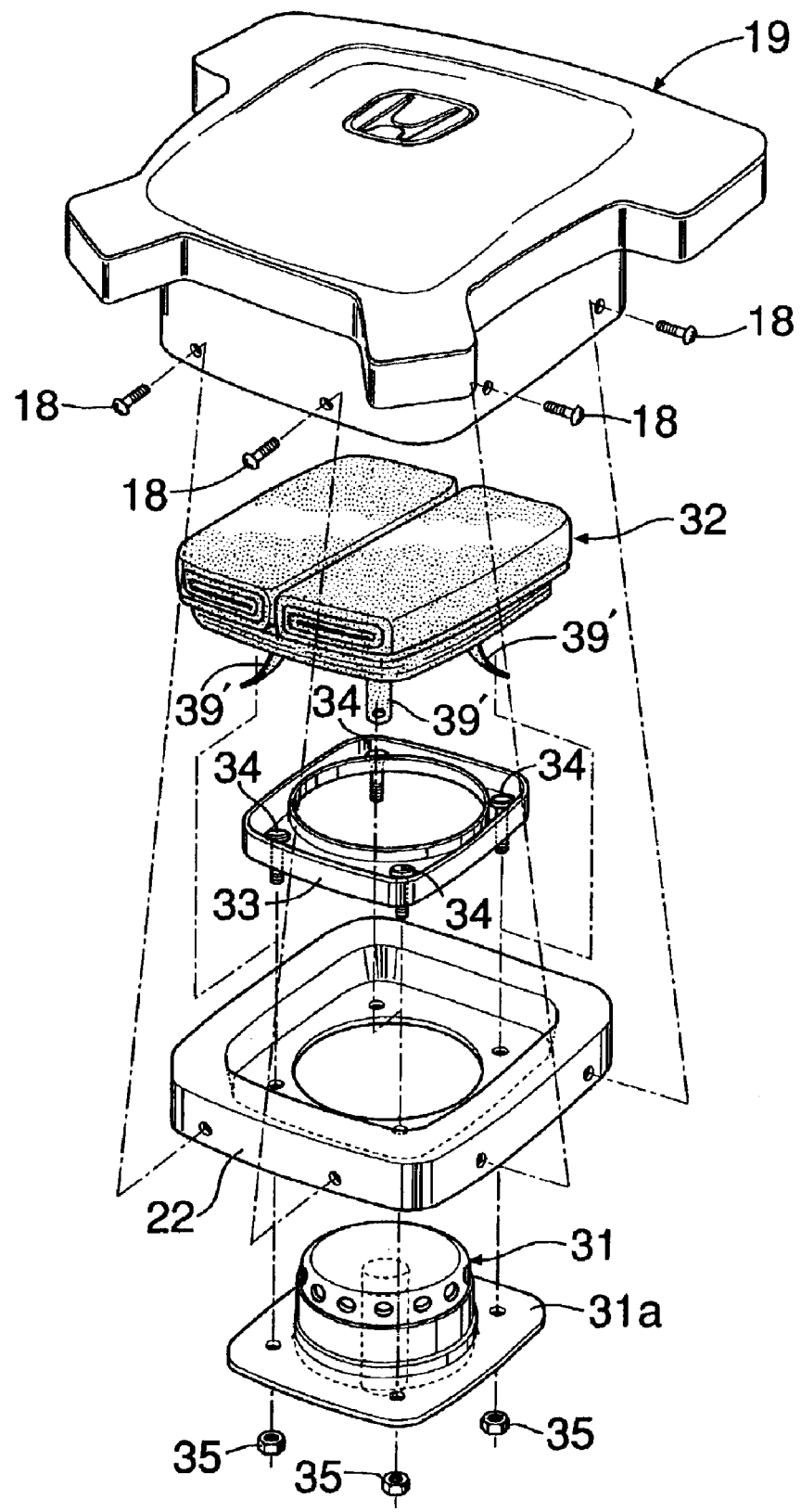

As shown in FIGS. 9 and 10, a steering wheel 12 includes a boss 16 fixed to a rear end of a steering shaft 14 by a nut 15, a front cover 17 fixed to the boss 16, a rear cover 19 fixed to a rear surface of the front cover 17 by bolts 18, a plurality of spokes 20 extending radially from the front cover 17, and a steering wheel body 21 connected to outer peripheries of the spokes 20. A retainer 22 is fastened to an inner peripheral surface of the retainer 19 commonly by the bolts 18, and supports an air bag module 13. A thin tear line 19a (see FIG. 9) is formed on an inner surface of the rear cover 19 and adapted to be broken upon expansion of the air bag 32.

The air bag module 13 includes an inflator 31 filled with a detonator to be burned to generate a high-pressure gas, the air bag 32 formed by sewing base fabrics, and a fixing ring 33 for fixing a base portion of the air bag 32. A flange 31a formed around an outer periphery of the inflator 31 and the fixing ring 33 are superposed on a front surface and a rear surface of the retainer 22 and fixed by bolts 34 and nuts 35 mounted in the fixing ring 33. At this time, the air bag 32 is fixed with its base portion sandwiched between the rear surface of the retainer 22 and the fixing ring 33.

Figure 11:
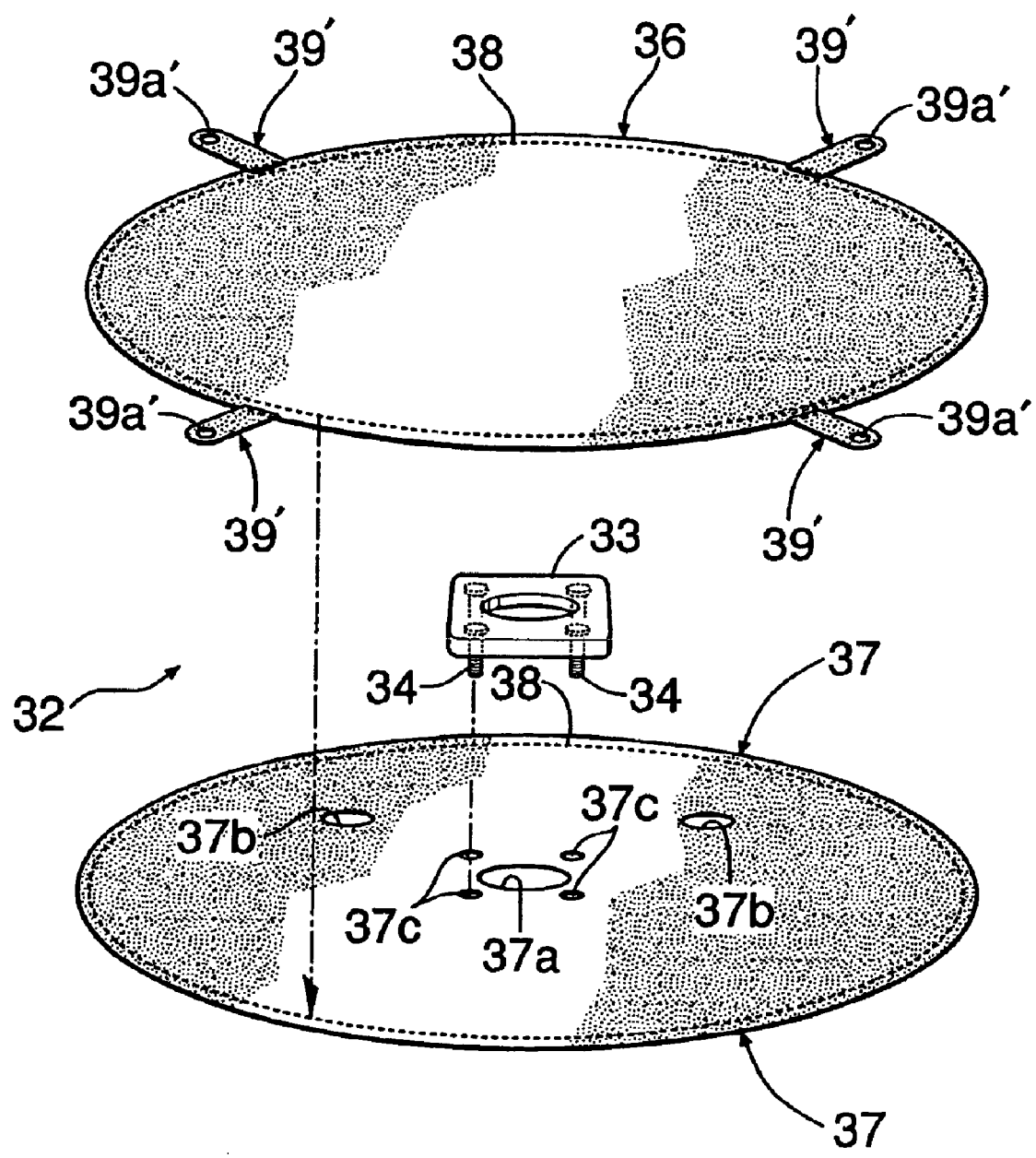

As shown in FIG. 11, the circular air bag 32 includes a first base fabric 36 on a back side (on a side opposed to an occupant), and a second base fabric 37 superposed on a front surface of the first base fabric 36. The first and second base fabrics 36 and 37 are sewn integrally to each other at a sewn portion 38 provided around the outer periphery. A central portion of the second base fabric 37 which becomes the base portion of the air bag 32, is provided with a circular opening 37a surrounding the inflator 31, vent holes 37b, 37b for releasing a portion of the gas upon the expansion of the air bag 32, and bolt bores 37c through which the bolts 34 are passed. A plurality (four in the present embodiment) of fine connecting members 39' made of a fabric are sewn at their one-ends to outer peripheries of the first and second base fabrics 36 and 37 at sewn portions 38, and bolt bores 39a' are made at the other ends of the connecting members 39'.

The order of folding the air bag 32 will be described below with reference to FIGS. 12 to 13O.

First, the fixing ring 33 is inserted through the opening 37a in the second base fabric 37 into the flatly spread air bag 32, and the four bolts 34 provided in the fixing ring 33 are inserted through the four bolt bores 37c in the second base fabric 37, as shown in FIG. 13A. Then, the air bag 32 is folded forwards along two folding lines L1, L1 inclined at 45°, as shown in FIG. 13B. At this time, the bolt bores 39a', 39a' in the two connecting members 39', 39' are fitted over two of the four bolts 34, as shown in FIG. 12. Further, the air bag 32 is folded forwards along two folding lines L2, L2 perpendicular to the two folding lines L1, L1, and the bolt bores 39a', 39a' in the other connecting members 39', 39' are fitted over the other two bolts 34, 34, as shown in FIG. 13C.

A left half of the air bag 32 formed into a square shape as the above-described manner is folded backwards along a folding line L3, as shown in FIG. 13D, and then folded so that it is wound leftwards from the side of its tip end, as shown in FIGS. 13D to 13F. Subsequently, a right half of the air bag 32 is folded laterally symmetrically with the left half, as shown in FIG. 13G. Then, an upper half of the air bag 32 brought into a longitudinally longer shape is folded rearwards along a folding line L4, as shown in FIG. 13H, and then folded so that it is wound upwards from the side of its tip end, as shown in FIGS. 13H to 13L. Subsequently, a lower half of the air bag 32 is folded substantially vertically symmetrically with the upper half into a square block shape, as shown in FIGS. 13M to 13O, whereby the folding-up of the air bag 32 is completed. The folding frequency of the upper half (see FIGS. 13H to 13L) is larger than that of the lower half (see FIGS. 13M to 13O) in the embodiment.

In a state in which the inflator 31 has been inserted through the opening 37a in the second base fabric 37 into the completely folded air bag 32, the four bolts 34 mounted in the fixing ring 33 and passed through the four bolts bores 37c in the second base fabric 37 and the four bolt bores 39a' in the connecting members 39' are further passed through the retainer 22 and the flange 31a of the inflator 31 and fastened by the nuts 35, whereby the air bag 32 is fixed in a manner that the periphery of the opening 37a in the second base fabric 37 and the other ends of the connecting members 39' are sandwiched between the fixing ring 33 and the retainer 22.

Thus, when an acceleration equal to or higher than a predetermined value is detected upon collision of a vehicle, the inflator 31 is ignited, whereby the folded air bag 32 is started to be expanded by the gas generated by the inflator 31. The tear line 19a of the rear cover 19 receiving a pressure of expansion of the air bag 32 is broken, and the air bag 32 is deployed into a vehicle compartment through an opening resulting from the breakage of the tear line 19a.

Figure 14:
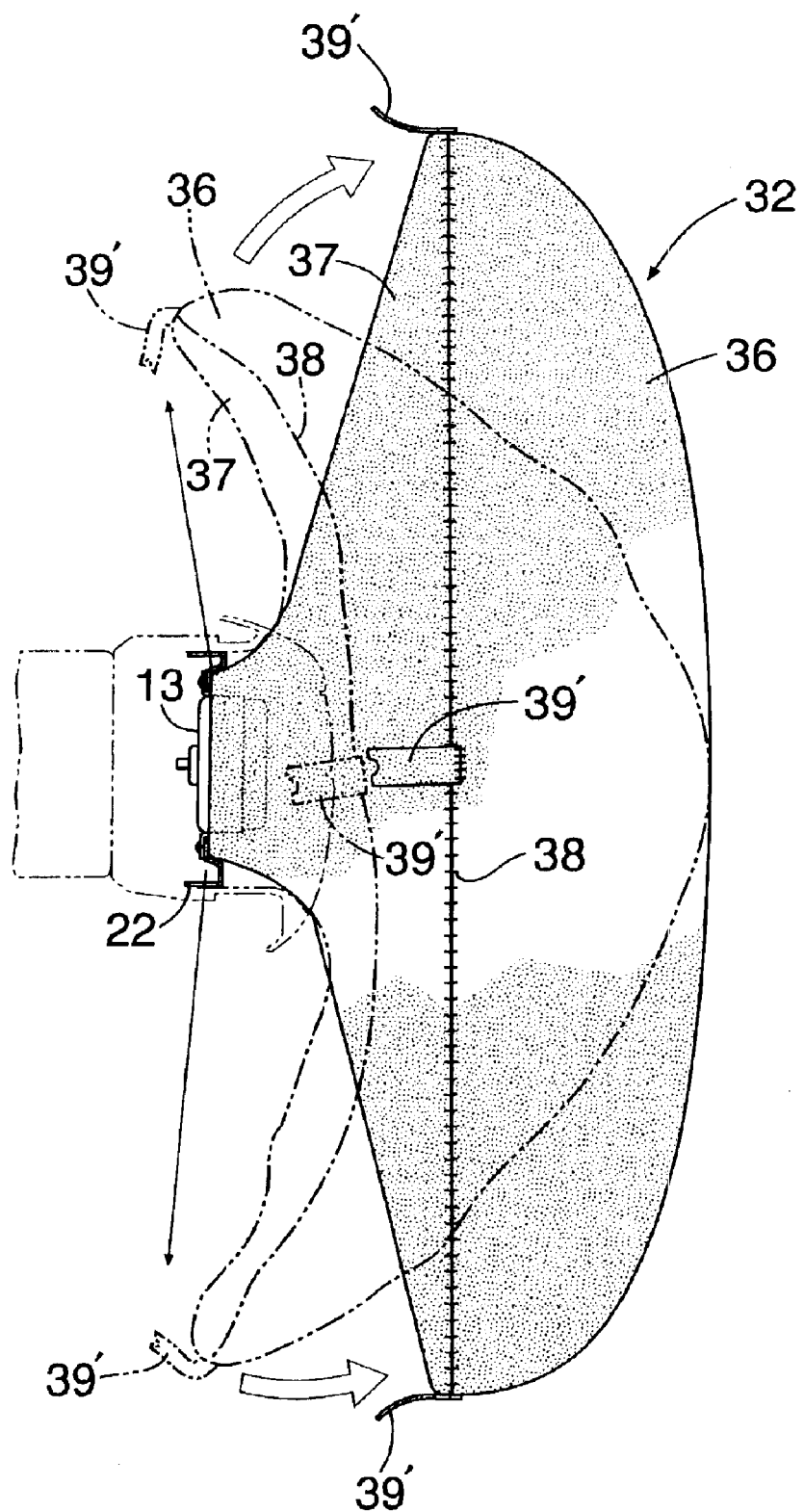

As shown in FIG. 14, when the air bag 32 is unfolded in the process of expansion of the air bag 32, the four connecting members 39' become taut, so that the sewn portion 38 on the outer periphery of the air bag 32, to which the connecting members 39' are connected, is pulled forwards, whereby the air bag 32 is deployed rearwards with the first base fabric 36 becoming round. Thus, it is avoided that the sewn portion 38 harder than the first base fabric 36 contacts an occupant. When the expansion of the air bag 32 progresses further, the connecting members 39' cannot withstand a tensile force and are broken, whereby the air bag 32 is deployed into a final shape. In this way, it is possible to avoid that the harder sewn portion 38 of the expanded air bag 32 contacts the occupant, to softly restrain the occupant by controlling the expanded shape of the air bag 32 by the operation of the connecting members 39'.

Figure 15:
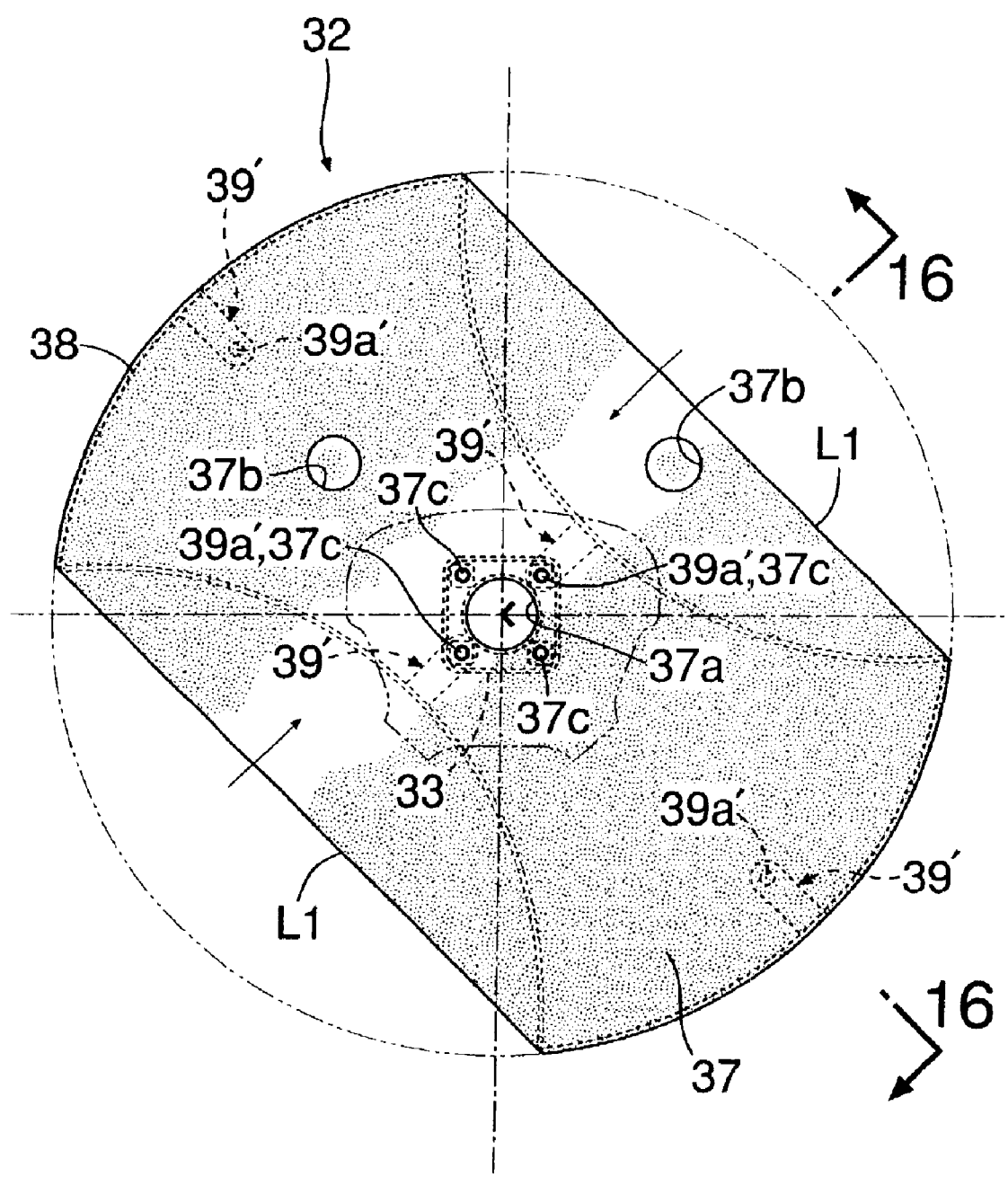
Figure 16:
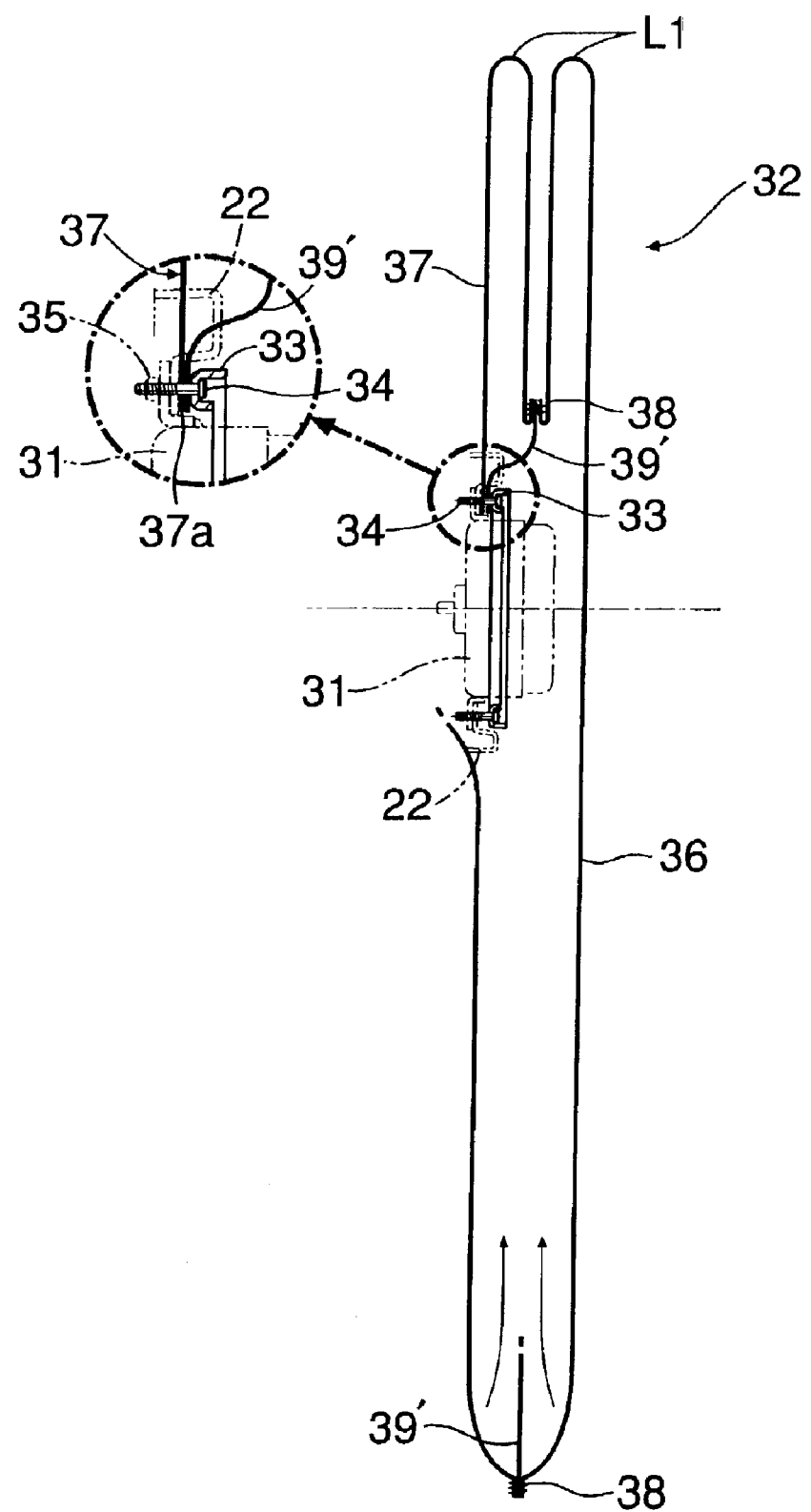

A fourth embodiment of the present invention will now be described with reference to FIGS. 15 and 16.

The four connecting members 39' of the air bag 32 in the third embodiment extend diametrically outwards from the outer periphery of the air bag 32, but four connecting members 39' of an air bag 32 in the fourth embodiment extend diametrically inwards from an outer periphery of the air bag 32, namely, so that they are sandwiched between a first base fabric 36 and a second base fabric 37. The arrangement of other components is the same as that in the third embodiment.

The air bag 32 in the fourth embodiment is different from that in the third embodiment with respect to an initial portion of a procedure of folding the air bag 32. More specifically, in the third embodiment, to fold the circular air bag 32 first into the square shape, the air bag 32 is folded forwards along the two folding lines L1, L1 inclined at 45° to flat edges of the fixing ring 33 as shown in FIG. 13B, and further folded forwards along the two folding lines L2, L2 perpendicular to the two folding lines L1, L1 as shown in FIG. 13C. On the other hand, in the fourth embodiment, the air bag 32 is folded inwards along folding lines L1, L1, L2, L2, so that it is turned inside out (see FIG. 16).

As a result, the four connecting members 39' are moved toward an opening 37a at the center of a second basic fabric 37 within the air bag 32. Therefore, a fixing ring 33 is inserted through the opening 37a into the air bag 32 at this stage, and four bolts 34 of the fixing ring 33 are inserted through four bolt bores 39a' in the four connecting members 39' and four bolt bores 37c in the second basic fabric 37. Thereafter, the folding of the air bag 32 is completed through procedures shown in FIGS. 13D to 13O as in the third embodiment.

Thus, according to the fourth embodiment, in addition to the function and effect in the third embodiment, it is possible to further reliably avoid that a hard sewn portion 38 of the air bag 32 contacts an occupant, because the hard sewn portion 38 of the air bag 32 is folded inwards and deployed lastly.

A fifth embodiment of the present invention will now be described with reference to FIGS. 17 to 18G.

Figure 12:
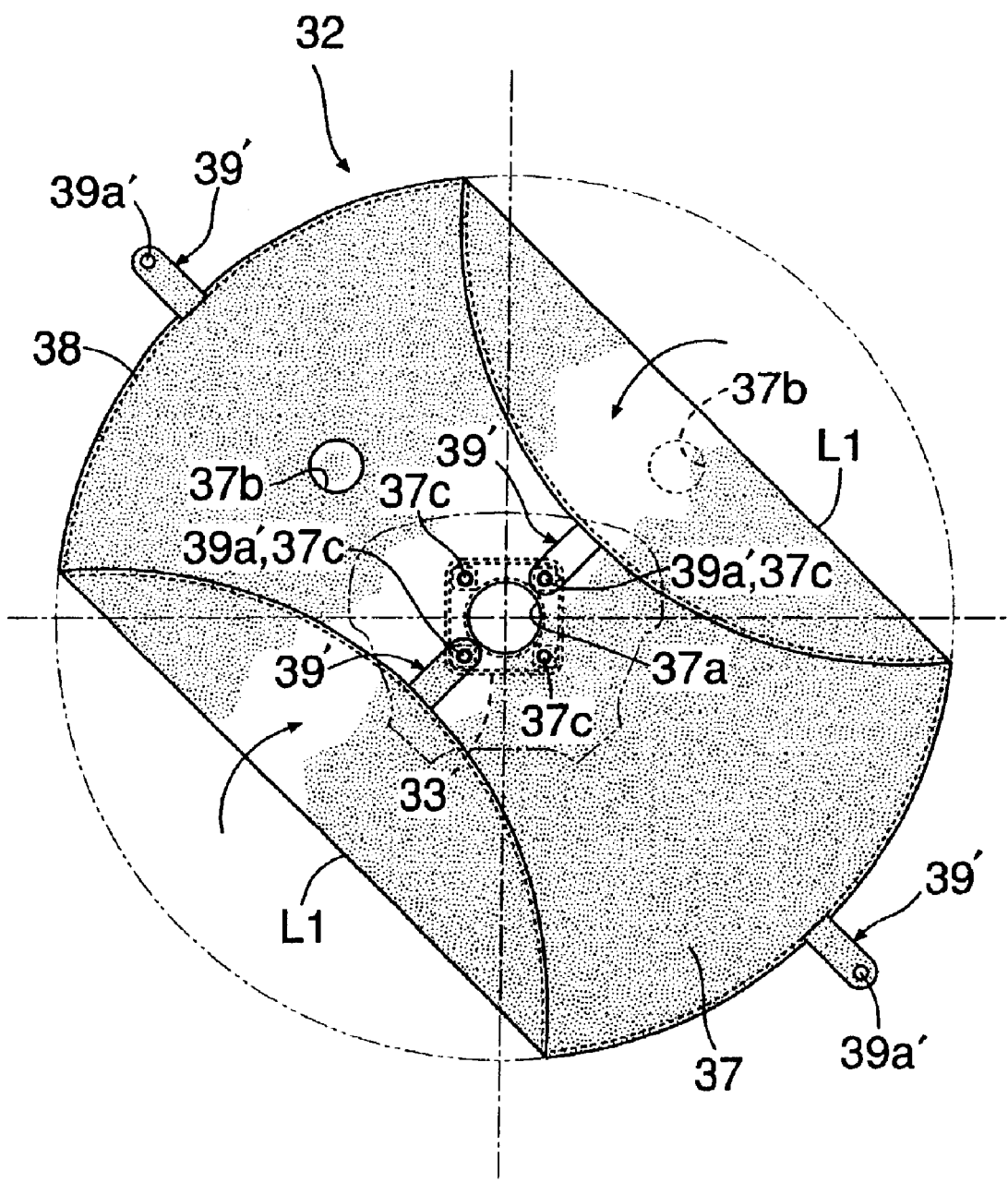
Figure 17:
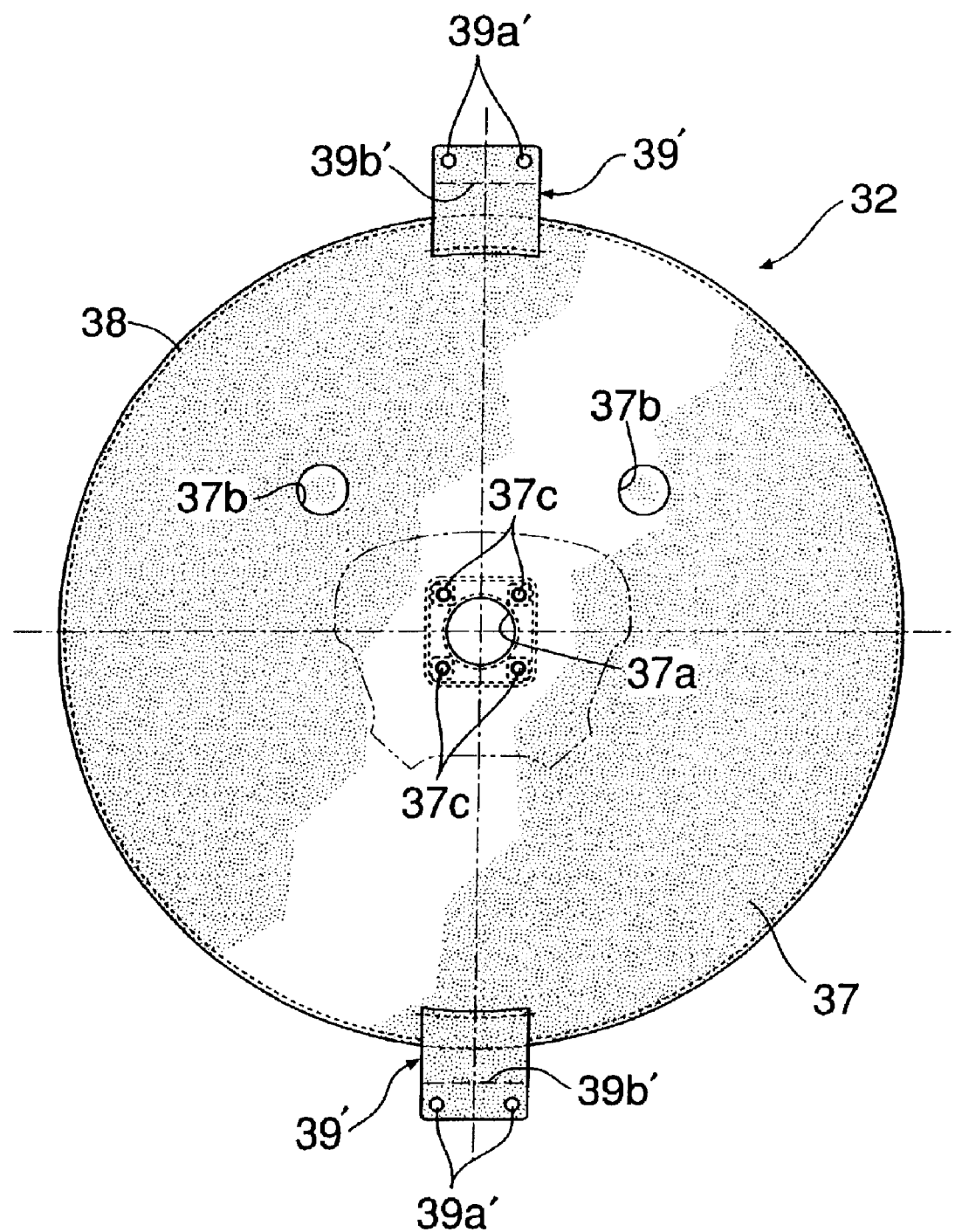

As can be seen by comparison between FIG. 17 and FIG. 12 (the third embodiment), the air bag 32 in the third embodiment includes the four connecting members 39', whereas an air bag 32 in the fifth embodiment includes a total of two connecting members 39', 39' each provided at upper and lower locations. The connecting members 39', 39' are wide and cannot be easily broken, and hence a perforation 39b' for assisting the breakage of the connecting members 39', 39' is provided in the vicinity of bolt bores 39a', 39a'. The structure of the other portions of the air bag 32 is the same as that in the third embodiment.

The order of folding the air bag 32 will be described below with reference to FIGS. 18A to 18G.

First, a fixing ring 33 is inserted through an opening 37a in a second basic fabric 37 into an air bag unfolded flatly, and four bolts 34 (see FIG. 11) provided on the fixing ring 33 are inserted into four bolt bores 37c in the second basic fabric 37. Then, as shown in FIGS. 18A to 18D, left half and right half of the air bag 32 are folded in a zigzag manner into a laterally symmetric shape, so that the entire air bag assumes a longitudinally longer oblong shape. Subsequently, as shown in FIGS. 18E to 18G, upper half and lower half of the air bag 32 of the longitudinally longer oblong shape are folded in a zigzag manner into a vertically symmetric shape, so that the entire air bag assumes a square shape, whereby the folding is completed. In this case, at a stage shown in FIGS. 18F and 18G at which the folding of the upper half (or the lower half) is completed, the two bolts 34, 34 of the fixing ring 33 are inserted through the two bolts bores 39a', 39a' in the upper (or lower) connecting member 39'.

Thus, also in the fifth embodiment, when the air bag 32 is unfolded in the process of expansion thereof, the two connecting members 39', 39' become taut, whereby the air bag 32 is expanded rearwards in such a manner that an outer periphery of the air bag 32 connected to the connecting members 39', 39' is pulled forwards, and a first basic fabric 36 is expanded rearwards assuming a round shape. Thus, it is avoided that a sewn portion harder than the first basic fabric 36 contacts an occupant. When the expansion of the air bag is further advanced, the perforations 39b', 39b' in the connecting member 39', 39' cannot withstand a tension and are broken, whereby the air bag 32 is deployed into a final shape. Thus, a function and effect same as those in the third embodiment can be achieved.

Although the embodiments of the present invention have been described above in detail, it will be understood that various modifications in design may be made without departing from the spirit and scope of the invention defined in the claims.

For example, the air bag module 13 for the driver's seat has been illustrated in each of the embodiments, but the present invention is also applicable to an air bag module used for an assistant driver's seat or for another application.

In addition, the air bag 32 is expanded laterally after being expanded vertically in the first and second embodiments, but the order of the expansion may be changed properly as required.

Further, the material of the connecting members 39' in each of the third to fifth embodiment is not limited to the fabric, and may be a material such as a thread or a string as long as it is broken by a tension.

What is claimed is:

1. An air bag device in which a folded air bag having a sewn portion along its outer periphery and an inflator are supported on a retainer, and which is adapted to make the air bag expanded and deployed into a vehicle compartment by a gas generated by the inflator upon collision of a vehicle, wherein the air bag comprises a plurality of base fabrics which are sewn together at outer peripheries thereof, wherein a base of the air bag fixed to the retainer and the outer periphery of the air bag are connected to each other by a connecting member in the process of folding the air bag, and when the air bag is expanded, it breaks the connecting member, said connecting member extending diametrically inwards from the outer periphery of the air bag so as to be sandwiched between the base fabrics, and further including a fixing ring which fixes the base of the air bag, the retainer and the inflator together, said fixing ring being disposed between said base fabrics, and said connecting member being connected to said fixing ring as disposed between said base fabrics.

2. The air bag device according to claim 1, wherein the sewn outer peripheries of the base fabrics are folded inwardly between the base fabrics for being connected to the base of the air bag, such that the sewn outer peripheries of the base fabrics are deployed last when the air bag is deployed.

3. The air bag device according to claim 1, including a plurality of said connecting members spaced around the sewn outer peripheries of the base fabrics.

4. The air bag device according to claim 1, wherein said connecting member has one end sewn together with the peripheries of said base fabrics.

5. The air bag device according to claim 1, wherein said connecting member has one end sewn together with the peripheries of said base fabrics, and an opposite end of said connecting member is connected to said fixing ring.

* * * * *